United States Patent [19]
Focsaneanu et al.

[11] Patent Number: 5,991,292
[45] Date of Patent: Nov. 23, 1999

[54] NETWORK ACCESS IN MULTI-SERVICE ENVIRONMENT

[75] Inventors: Mihai Focsaneanu, Nepean; Richard Prescott Skillen, Mississauga; Frederick Caldwell Livermore, Stittsville, all of Canada

[73] Assignee: Nortel Networks Corporation, Montreal, Canada

[21] Appl. No.: 08/812,807

[22] Filed: Mar. 6, 1997

[51] Int. Cl.[6] ............................ H04J 3/02; H04Q 11/04
[52] U.S. Cl. .................. 370/352; 370/401; 370/419; 370/421; 370/463; 709/250
[58] Field of Search ................... 370/254, 352, 370/353, 354, 357, 359, 360, 362, 376, 389, 400, 401, 402, 419, 420, 421, 463, 465, 468, 477; 709/249, 250

[56] References Cited

U.S. PATENT DOCUMENTS

| | | | |
|---|---|---|---|
| 4,178,480 | 12/1979 | Carbrey | 179/15 BM |
| 4,608,686 | 8/1986 | Barsellotti | 370/69.1 |
| 4,903,263 | 2/1990 | Patel et al. | 370/110.1 |
| 5,157,662 | 10/1992 | Tadamura et al. | 370/110.1 |
| 5,267,301 | 11/1993 | Nishii | 379/93 |
| 5,289,536 | 2/1994 | Hokari | 379/221 |
| 5,410,754 | 4/1995 | Klotzbach et al. | 370/85.13 |
| 5,428,608 | 6/1995 | Freeman et al. | 370/60.1 |
| 5,444,703 | 8/1995 | Gagliardi et al. | 370/60.1 |
| 5,453,984 | 9/1995 | Mueller | 370/421 |
| 5,526,351 | 6/1996 | Mochinaga et al. | 370/85.13 |
| 5,577,115 | 11/1996 | Deutsch et al. | 379/399 |
| 5,610,910 | 3/1997 | Focsaneanu et al. | 370/351 |
| 5,629,926 | 5/1997 | Deutsch et al. | 370/252 |
| 5,742,905 | 4/1998 | Pepe et al. | 455/461 |
| 5,799,017 | 8/1998 | Gupta et al. | 370/421 |

FOREIGN PATENT DOCUMENTS

WO 95/27384  10/1995  WIPO ............................ H04Q 11/04

OTHER PUBLICATIONS

Verbiest, W. et al., "FITL and B-ISDN: A Marriage with a Future", IEEE Communications Magazine, vol. 31, No. 6, Jun. 1, 1993, pp. 60–66.

Frohm, N. et al., "The Diamux System Series—Flexibility in the Access Network", Ericsson Review, vol. 70, No. 1, Jan. 1, 1993, pp. 30–40.

Serro, C. et al., "Services Architecture in SEIS—A System for Intelligent Buildings", Proceedings of the Mediterranean Electrotechnical Conference, vol. 1, No. 6, May 22–24, 1991, pp. 558–561.

Primary Examiner—Alpus H. Hsu
Attorney, Agent, or Firm—Gowling, Strathy & Henderson; Yoshiharu Toyooka

[57] ABSTRACT

In current voice telephony, CATV, and wireless networks, traffic is channelized for both access and transport. This channelization is wasteful of resources where multiple services have varying demands for bandwidth and holding times, or a service generates traffic that is bursty in nature. The invention solves these problems by providing flexible and adaptable multi-service access to the networks. Customer requirements are checked by monitoring traffic on a local access at a connection request and/or during the established connection, and the local access is configured according to the transmission requirements. The local access can also be configured in response to the network information. In further realizations, either or both the CPE connector and access module include common bus architecture which forms a backbone LAN for handling a multiplicity of CPEs and/or networks.

29 Claims, 18 Drawing Sheets

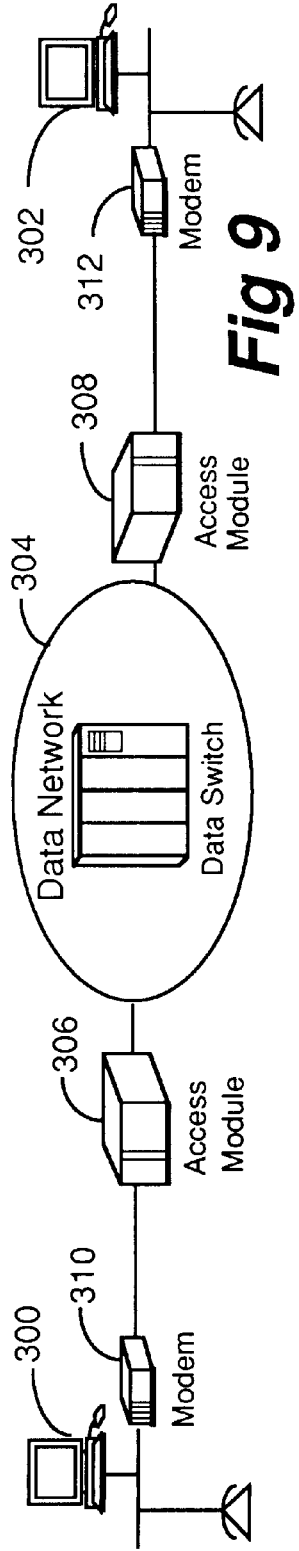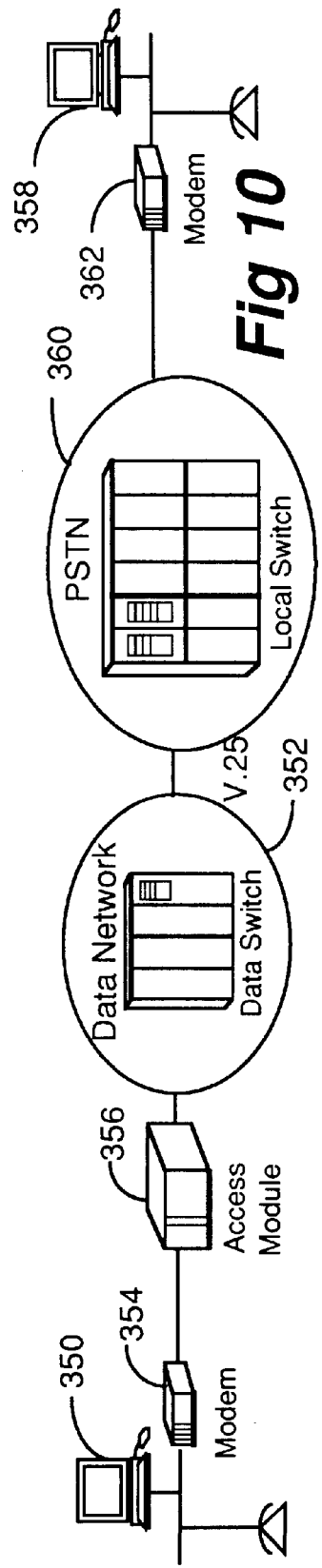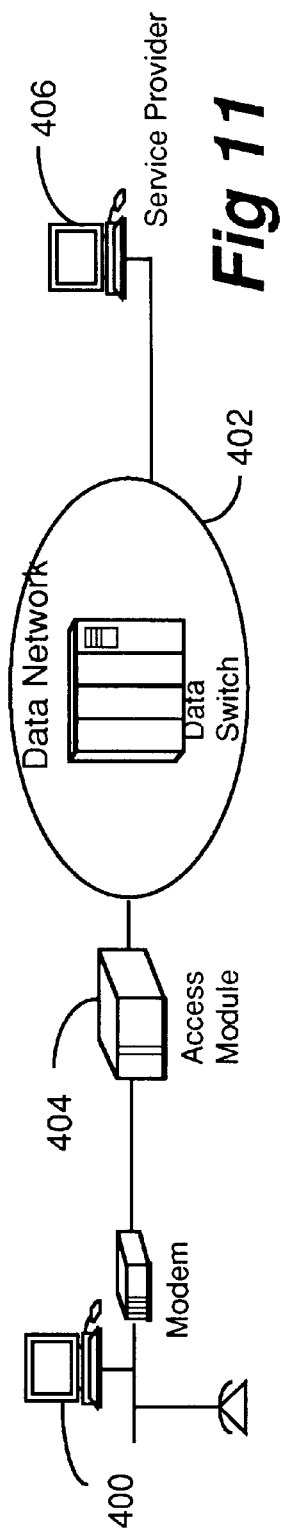

NETWORK ACCESS IN MULTI-SERVICE ENVIRONMENT

FIELD OF THE INVENTION

The present invention relates to a multi-service access platform which permits the formation of a universal service network encompassing a plurality of telecommunication networks. The invention relates particularly to a multi-service platform which allows a plurality of CPEs accessing any services provided by a plurality of service providers which may utilize any of the plurality of telecommunication networks.

CROSS-REFERENCED PATENT APPLICATION

Co-pending U.S. patent application Ser. No. 08/516,269 filed Aug. 17, 1995, Focsaneanu et al, "Access to Telecommunications Networks in Multi-Service Environment". This application is now issued to U.S. Pat. No. 5,610,910 on Mar. 11, 1997.

Co-pending U.S. patent application Ser. No. 08/745,171 filed Nov. 7, 1996, Goheen et al, "Access to Telecommunications Networks in a Multi-Service Environment".

BACKGROUND OF THE INVENTION

Facsimile machines and other data-handling customer premise equipment are introduced not only into offices but individual homes in great numbers. As personal computers are found in more homes, users of computer networks such as "Internet" by way of telephone networks through modems are increasing in phenomenal numbers. The majority of these data transactions through modems or fax machines use existing local exchange carrier networks for data transmission. Fax machines, computers, and telephone sets at a customer premise are connected by local access to a central telephone switching office. The local access is variously called as subscriber's loop, local loop, drop etc. In cases of CATV or wireless, local access is also called subscriber connection, wireless access etc. It has been shown that the majority access "Internet" by dial-up telephone connection. FIG. 1 shows how a telephone, fax computer and other intelligent agents are typically connected through a publicly switched telephone network and data networks and their interconnections. Terminal equipment at a customer premise consist of a telephone set, fax machine, a personal computer etc., and are collectively called CPE which stands for customer premise equipment. CPE 10 is connected through inside wiring 12 at the customer premise and then through the feeder/distribution plant (also called subscriber's loop, local access loop) 14 to an access module (e.g. linecard) 16. The linecard is in turn connected to a local switch 18 that is part of the public switched telephone network (PSTN) 20. PSTN operates in channelized mode and provides continuous connection to another subscriber 22. The telephone service is established through a connection protocol (e.g. dialup, on-hook/off-hook protocol) and upon connection provides fixed channelized bandwidth on a continuous basis for the duration of the call. A facsimile connection is essentially the same as a telephone connection with the exception of the presence of a modem 24 at each facsimile terminal. The figure also shows a connection involving a data network. For such a connection, the CPE (e.g. computer) also requires a telephone subscriber's loop to the PSTN by dialup service which connects to a data service provider 26 through its own subscriber's loop 28. The data service provider 26 then provides a data connection through a data network 30 to a database service or other data service subscribers.

The present CATV service is mainly unidirectional, broadcast from a service provider through its own network which has no connection to any other network. In small scale, experimental multimedia telecommunications networks are being field tested at some locations. Referring to FIG. 2, such CATV access to telecommunications services is illustrated. In the figure, the CPE (e.g. TV) is connected through local wiring (possibly coax or fiber optic) to a converter 40, sometimes called a set-top box, that connects to the drop cable, taps, and splitters to a CATV access module 42 through an access loop 44 (most likely fiber optic or coax) and then through to the CATV services provider (cableco) 46 or other service providers 48 at which point connections to other service networks 50 can be provided. It is common for each subscriber to require a separate bidirectional channel for two-way telecommunications services. FIG. 2 also shows a wireless connection. For wireless service, the CPE is connected through the wireless interface or CPE connector 40 and a radio frequency channel 52 to a base station or access module 42, and then to the wireless service provider who in turn provides a connection to the specific service or transport network such as PSTN 54. During the entire call, a fixed amount of channel bandwidth is allocated to the service even though the specific radio frequency channel may change in a seemingly uninterrupted manner during the call.

In all these cases, the CPE is provided with channelized access of a fixed bandwidth, which makes it difficult to provide other services or to change service parameters during the time that the connection is established.

Computer connections are generally much longer in duration than voice or other connections. Computers perform data transactions in packets and their traffic is very bursty. The bursty traffic is more suitable for statistical multiplexing and is most efficiently handled by specially designed data networks such as packet switched networks. At present, however, all publicly switched traffic, data and voice, is sent over the subscriber's loop and interoffice trunking in a circuit switched network connection to destination customer premise equipment or to a data network.

Multimedia broadband switched networks by the name of the "Information Superhighway" have been widely proposed. This superhighway may carry different types of traffic seamlessly, accepting voice, data and video information from any terminal and delivering it to any other terminals simultaneously. At present, however, different types of networks, both channelized and packetized, exist separately and independently.

In circuit switched networks, a connection is maintained during the whole duration of a call through switches and other associated network elements, regardless of the type of call. Only one circuit switched connection can be maintained for the call. No broadcast or multicast through the circuit switched network is possible. Today, telephone networks are becoming increasingly more occupied by data traffic which generates no additional revenues to the local exchange carriers. Furthermore, access to worldwide computer networks, such as "Internet" etc. is now being provided by commercial network service providers, such as "America Online", "SprintLink" etc. Using PSTN as the access, the network service providers provide access to various other private networks, academic networks etc., which contain vast numbers of databases for value added services.

FIG. 3 shows diagrammatically how data networks such as "Internet" are accessed through a telephone subscriber's loop. An individual end user subscribes to the service of a commercial network service provider 60. Access to a data network is usually by dialing the telephone number of a commercial data network service provider using a modem. Thus the end user CPE 62 uses a modem and makes a dialup connection to a local switch 64 by a subscriber's loop 66. The local switch 64 makes an inter-office trunk connection 68 to a terminating local switch 70 within a PSTN 72. The terminating local switch connects through a local loop 74 and a terminating modem to a service provider 60. After a proper modem handshaking protocol, the user inputs the address of a destination such as the "Internet" server with whom he desires a connection. Data networks and database services are accessed using a TCP/IP protocol. The "Internet" packet is routed over a T-1 link 76 (or other facilities) to the Internet 78. In this arrangement, the local switches 64 and 70 as well as the interoffice trunk 68 are occupied for the duration of the connection, which is usually measured in hours rather than the shorter holding time associated with voice calls which are measured in minutes. Consequently, very expensive common equipment in the PSTN is required for the duration of the "Internet" access, even during a period of inactivity by the end user.

The use of a telephone network by network service users increases usage of the telephone network enormously without a proportionate increase of additional revenues to the telephone company. It is also cumbersome for an individual user to access various networks. It will be shown below that the present invention reduces this investment in the PSTN (31) as well as enhances the capabilities of the overall global communications network.

There have been many patents which address network data transfer issues. For example, U.S. Pat. No. 4,178,480, issued Dec. 11, 1979 (Carbrey), describes a single multiplexing circuit which permits use between a central communication system and a remote communication circuit for concurrently transmitting outgoing voice signals, outgoing data, and outgoing auxiliary signals from the remote communication circuit to the central communication system via a single pair of wires. Voice signals are audio signals in the voice frequency band. Input and output data streams comprise periodic bursts of bipolar pulses in PAM format transmitted in the voice band and the auxiliary signals are bipolar pulses in PWM format transmitted also in the voice band but during a silent period of data signals.

U.S. Pat. No. 4,608,686, issued Aug. 26, 1986 (Barselloti), describes a circuit for transmitting both voice and data at the same time between a subscriber's set and a switching exchange via a bidirectional wire link.

U.S. Pat. No. 5,410,754, issued Apr. 25, 1995 (Klotzbach et al), teaches an interface between a wire-line carrier system and a remote host on a LAN. The interface includes a protocol conversion between PCM data and TCP/IP packet data.

U.S. Pat. No. 5,267,301, issued Nov. 30, 1993 (Nishii), is directed to an interfacing device for discriminate voice and fax signals.

U.S. Pat. No. 4,903,263, issued Feb. 20, 1990 (Patel), relates to an adjunct device to existing switches for providing ISDN capabilities.

Hereinafter, the following terms will be used in connection with the description of the invention.

Network access (local access network)—A managed facility between the CPE and communications networks (e.g. copper pairs, coaxial, fiber, wireless).

Channelized protocol—Communications protocol requiring end-to-end allocation of network resources of a specified bandwidth for the duration of the session, independent of the actual information transfer activity (e.g. a circuit switched network, such as PSTN, implements a channelized protocol for telephone traffic).

Non-channelized protocol—Communications protocol allocating network resources for the duration of actual information transfer activity (e.g. a packet switched network implements a non-channelized protocol for transfer of signals).

Traffic in channelized format—Communications traffic using a channelized protocol.

Traffic in non-channelized format—Communications traffic using a non-channelized protocol.

OBJECTS OF THE INVENTION

It is an object of the invention to provide better utilization of CPE by providing an intelligent connection to multiple types of service and non-service specific transport networks in multiple protocol environments.

It is a further object of the invention to provide a system which allows a simpler, more transparent delivery of information on an end-to-end basis.

It is yet another object of the invention to provide a system for optimized throughput of existing access bandwidth according to specific service needs.

It is still another object of the invention to provide a system having improved functionalities between the CPE and access or service provider's LANs.

It is a further object of the invention to provide a flexible access system to utilize any transport network resource on a service-by-service basis.

It is yet a further object of the invention to provide a system which enables simultaneous multiple service delivery over the access network.

It is another object of the invention to provide a system which can perform an alternate routing of services among transport networks.

It is yet another object of the invention to provide a system which enables customer service and feature control by individual service.

SUMMARY OF THE INVENTION

Briefly stated, according to one aspect, the invention relates to an access network for interfacing CPEs and communications networks which encompass PSTN, data networks, wireless networks, satellite networks, CATV and ATM networks by way of local access to form a universal services network. The access network comprises a CPE connector and an access module. The CPE connector includes a common bus which interfaces the CPEs and the local access, and a bus controller for determining appropriate CPEs for connection with the local access. The access module comprises a line interface for interfacing the local access and the communications networks, and an access controller for determining appropriate network resources for connection with the local access.

According to another aspect, the access network comprises CPEs having CPE modem functionalities for interfacing the CPEs and the local access, and an access module for interfacing the local access and the communications networks. The access module comprises a common bus connecting line interfaces and the communications networks, and the line interfaces include access modem functionalities to communicate with the CPE modem functionalities through the local access. The access module further includes a processor for extracting the information content from traffic for services, and an access module bus controller for determining appropriate line interfaces and network resources for interfacing therebetween in response to the extracted information content.

According to yet another aspect, the access network comprises a CPE connector including a common bus which interfaces the CPEs and the local access, and a bus controller for determining appropriate CPEs for connection with the local access; and an access module including a common bus connecting line interfaces and the communications networks, the line interfaces including access modem functionalities to communicate with the CPE modem functionalities through the local access, and an access module bus controller for determining appropriate line interfaces and network resources for interfacing therebetween in response to the extracted information content.

BRIEF DESCRIPTION OF THE DRAWINGS

FIGS. 9–11 show various configurations in which the local access network of the invention is used;

DETAILED DESCRIPTION OF THE PREFERRED EMBODIMENTS OF THE INVENTION

Figure 1:
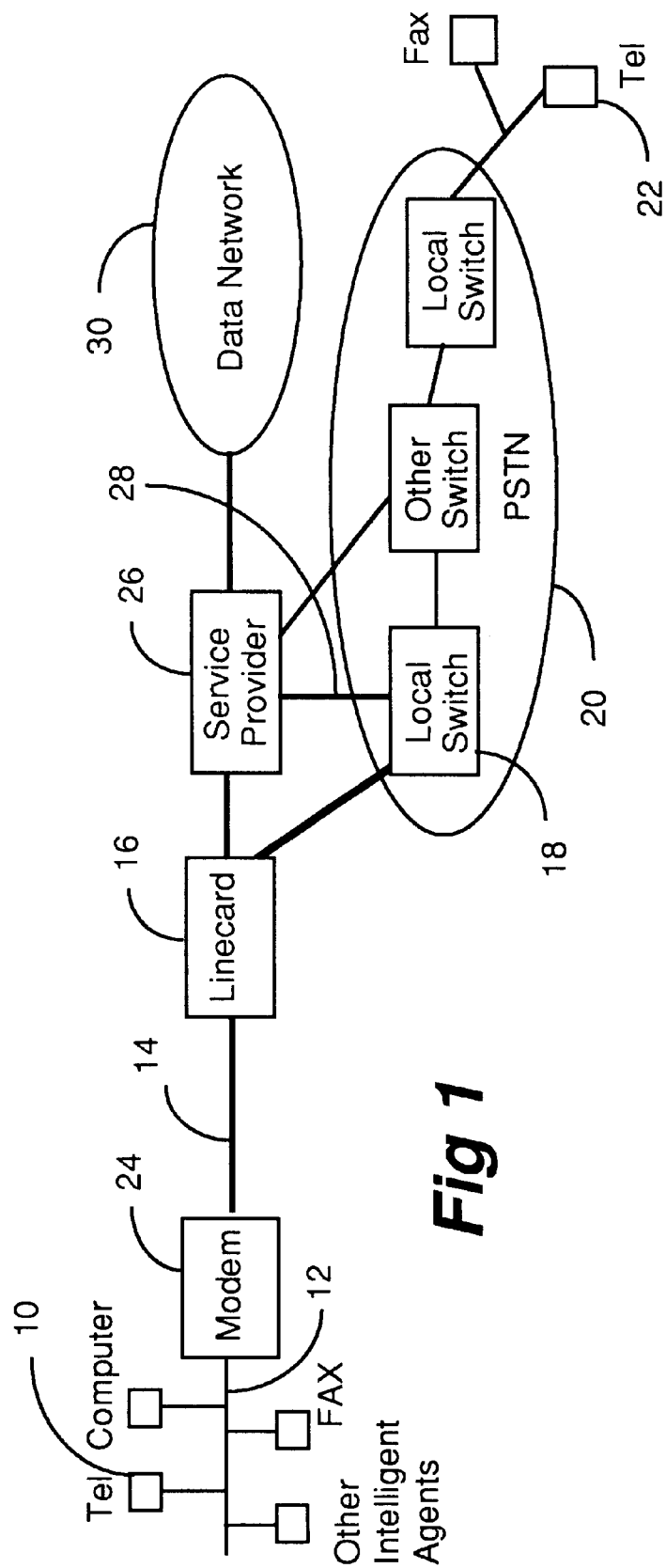
FIG. 1 shows access to service providers such as public switched network and data networks service providers.
Figure 2:
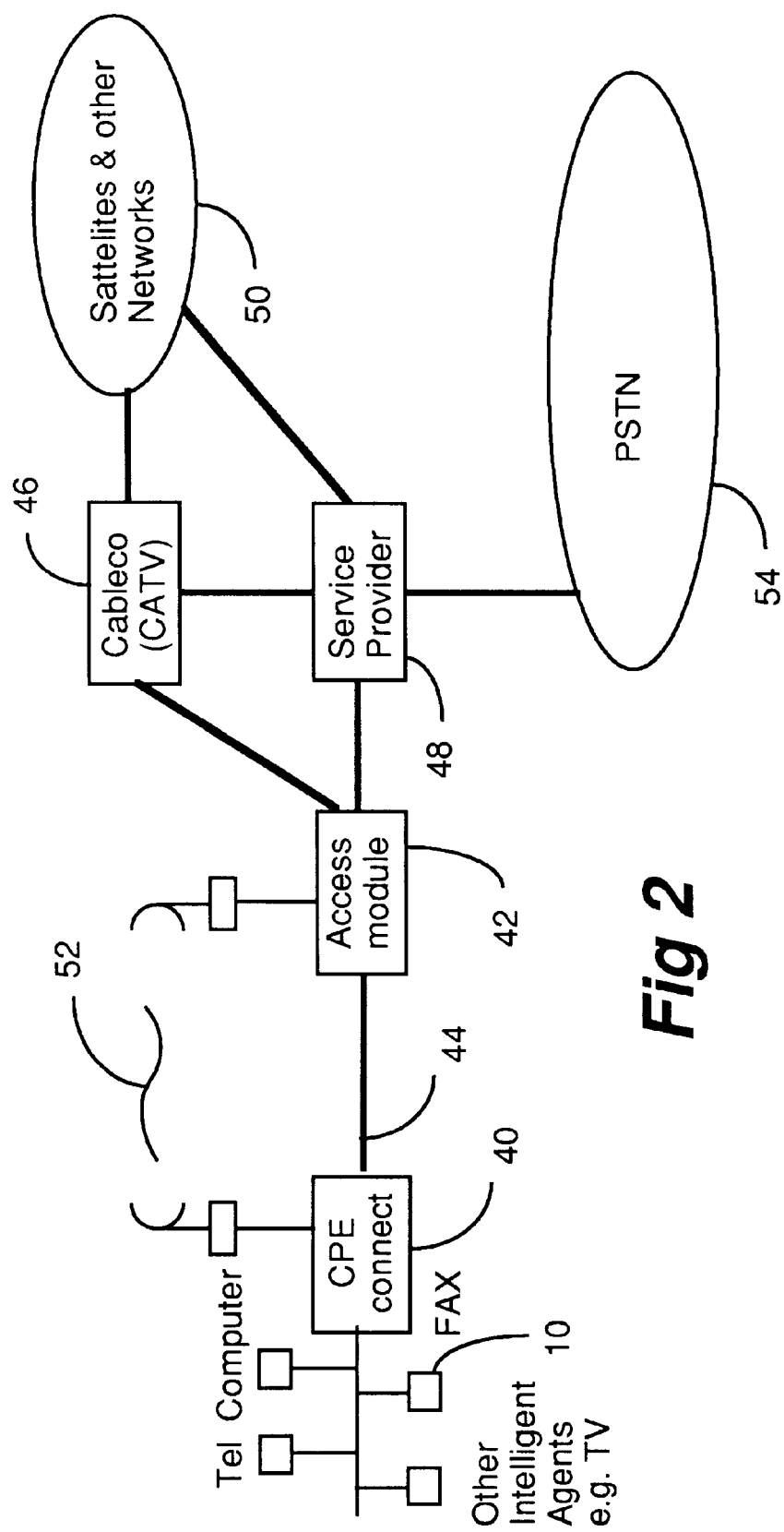
FIG. 2 shows CATV access to some other service providers.
Figure 3:
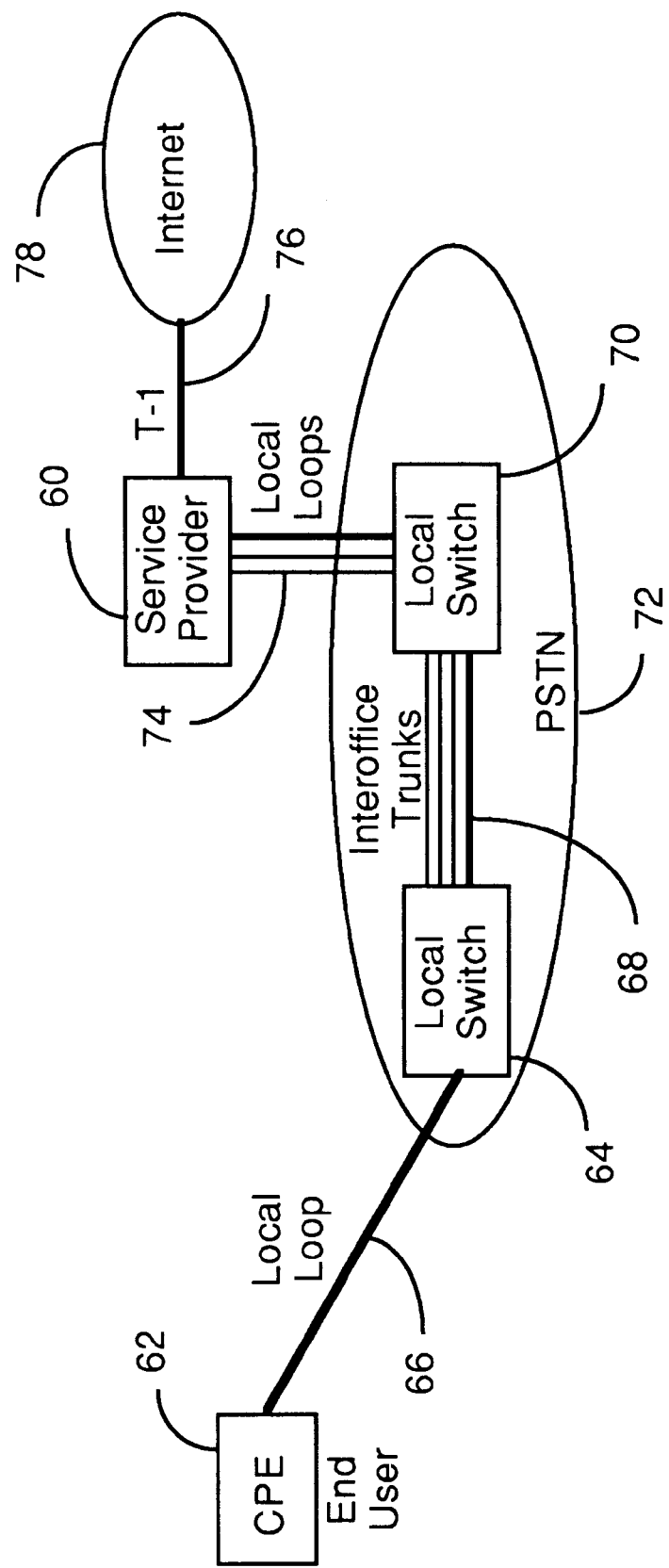
FIG. 3 is a schematic illustration of a presently used "Internet" access.
Figure 4:
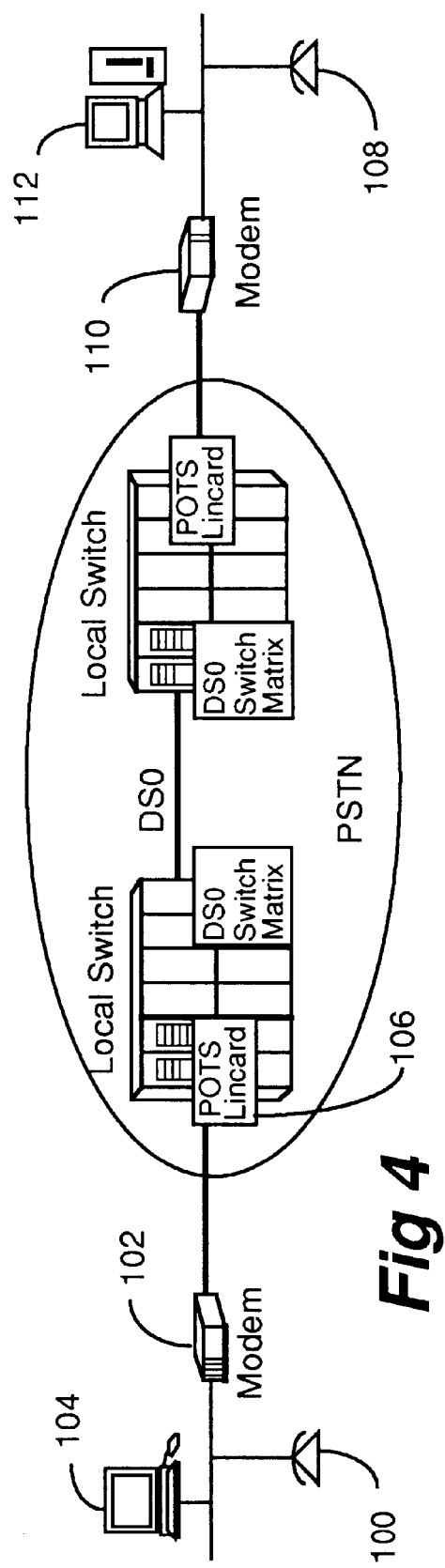
FIG. 4 shows a connection through a circuit switched network using POTS calling protocol.

FIG. 4 is a simple illustration of how telephone sets and computers are connected through today's PSTN, which is a circuit switched network of which, in this case, two local switches are shown. The calling protocol of a telephone is as follows: at a calling party, the off-hook is indicated by the telephone set (called POTS for plain old telephone set) 100 or by the modem 102 under the control of the computer 104 and is detected by a linecard 106. The local switch provides dial tone indicating that it is ready to receive the called party's telephone number. The digits dialled by the telephone set or modem represent the address of the called party and the switch provides a DS-0 channel between the two parties and applies ringing to the called party. In response to the ringing, a voice call can proceed when the called party's telephone set 108 goes off hook. Alternatively, the modem 110 at the called party can provide the off hook response to the ringing.

The modem 110 under the control of its computer 112 performs an appropriate handshaking with the calling party's modem before data exchange can proceed. A subsequent on hook from either party indicates the termination of the call and the DS-0 connection is dropped. In this example, a modem appears to the local switch similar to a telephone set.

Figure 5:
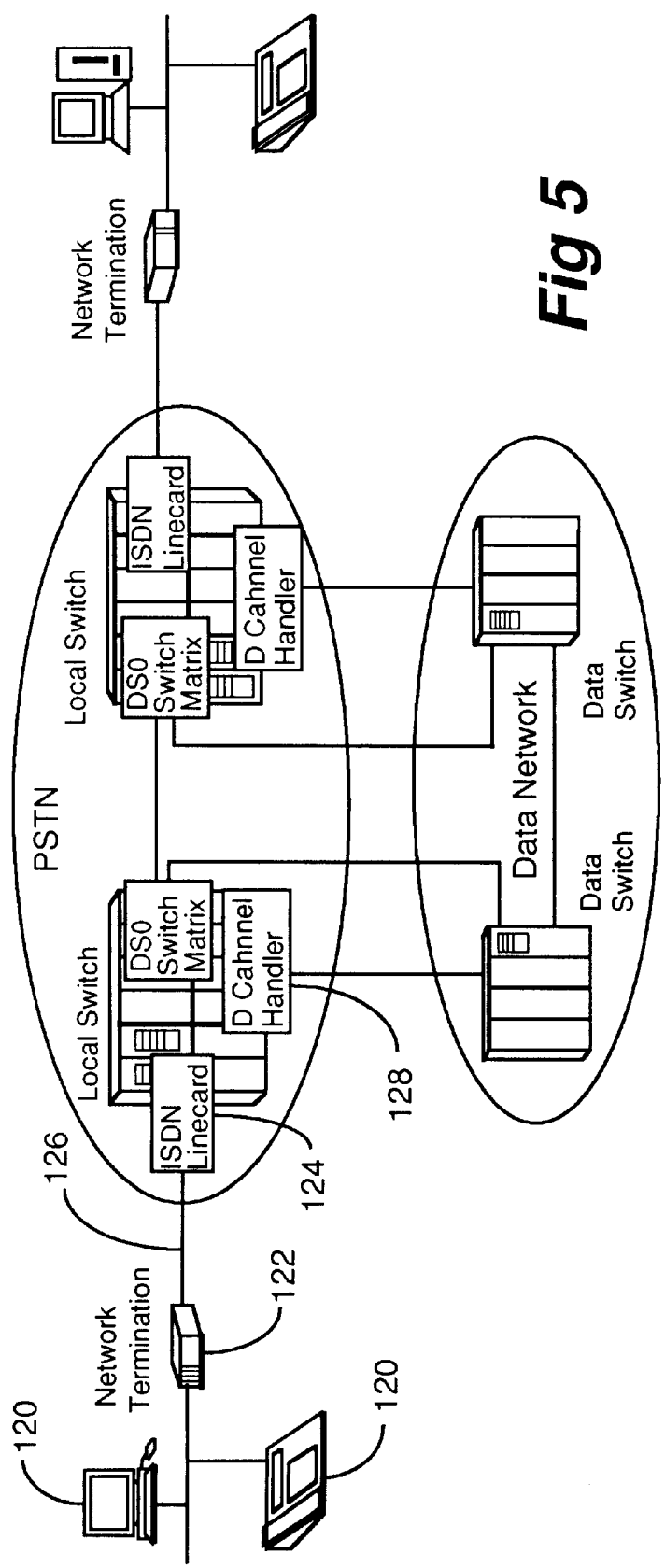
FIG. 5 shows connections through a circuit switched network and data switched network using ISDN calling protocol.

FIG. 5 shows diagrammatically how telephone sets and computers are connected through a PSTN in the known ISDN environment. An ISDN terminal 120 is connected by way of a network termination 122 to ISDN linecard 124 through a digital subscriber loop (DSL) 126. The ISDN terminal can be a computer or an ISDN telephone set, or a collection of them. The ISDN terminal sends a call request via a D channel packet specifying the address of the called ISDN party in accordance with the ISDN numbering plan (E.164 address). The D channel handler 128 at the local switch determines if the requested connection through the B channel is a circuit switched connection or a packet switched connection. The D channel handler can do this by checking the address of the called party. The circuit switched connection, e.g. voice (indicated by the called party's telephone number) is routed to another circuit switch which provides the access function to the called party. If the requested connection is a packet switched connection, the switch translates the address for data network routing and sends the request to the called party's terminal. The called party's terminal responds with an acceptance message. Subsequently, the data are passed through a DS-0 channel in the local switch serving the calling party to the data network and through a DS-0 channel in the local switch serving the called party to the called party's terminal.

Figure 6:
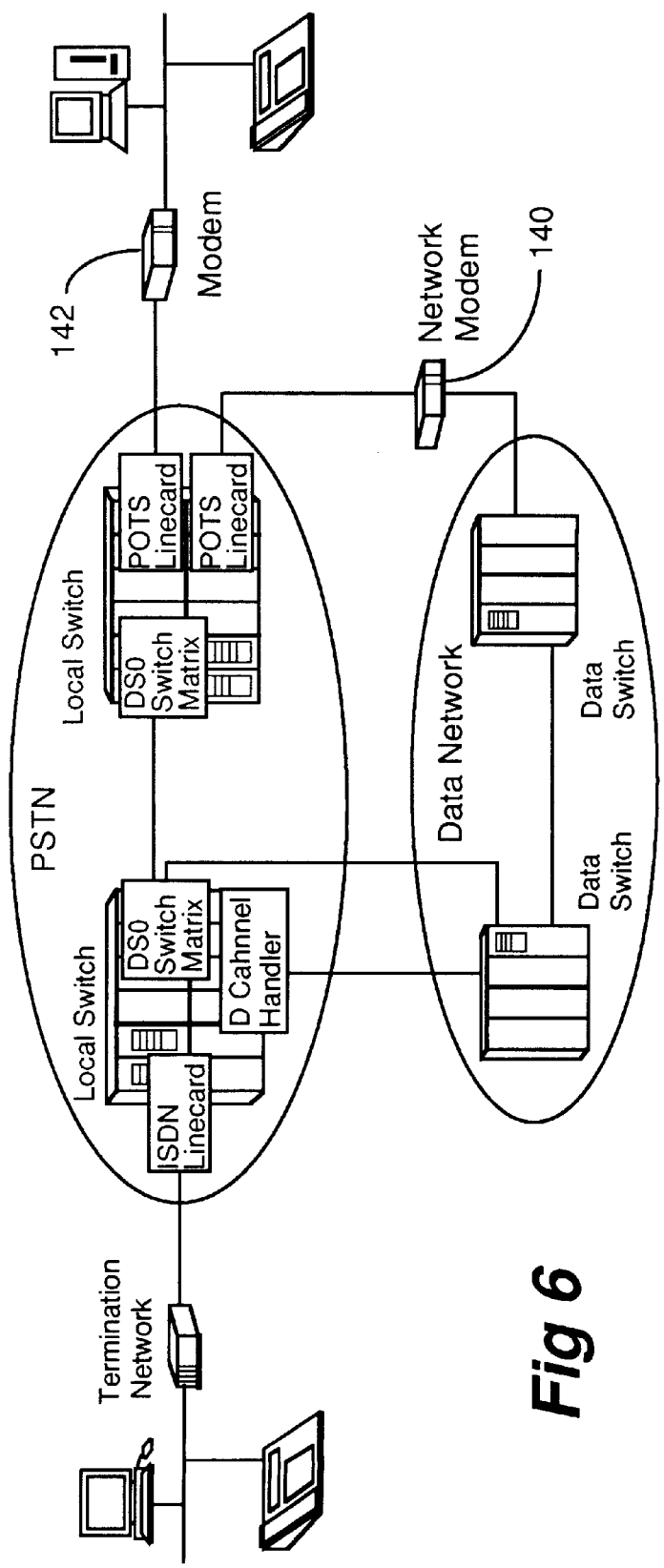
FIG. 6 shows connections through a circuit switched network and a data switched network using both ISDN and POTS calling protocols.

FIG. 6 is an illustration of another known instance where a connection is desired between an ISDN terminal and an ordinary telephone or a computer, both connected through an analog subscriber loop. A circuit switched connection is set up in each direction and maintained in a similar fashion, as shown in FIGS. 4 and 5. If the call request is a packet switched connection, the calling ISDN terminal must specify the E.164 address of a network modem 140. The network modem prompts the ISDN terminal for the called party's directory number and dial the called party. If a connection is requested by a computer at the ordinary telephone site to a computer at the ISDN site, the calling modem 142 dials the directory number of the network modem 140 which prompts the calling terminal for the destination ISDN directory number and completes the connection. In both cases, the data are passed through DS-0 channels in local switches.

As discussed earlier, the number of subscribers to "Internet" is growing at a very fast pace and it is expected that growth in the usage of data networks will continue. Access to such data networks through the existing telephone network and subscriber's loop is very inefficient and cumbersome. The invention solves these problems and helps to create one global data network with capabilities which are presently found in local area networks (LANs).

As also discussed above, today most data access is channelized due to the end-to-end requirements of modems in the access and transport networks. This invention provides the technology of interfacing CPEs and communications networks which encompass PSTN, data networks, wireless networks, satellite networks, CATV, ATM networks and the like, through local access to form a universal services network. This is accomplished by the use of a common protocol for encapsulating the data and signalling information between the CPE connector and the access module (this protocol is identical for all access media) and a transmission protocol appropriate for each access medium (e.g. 2B1Q for copper pairs). According to one aspect, the invention provides bi-directional emulation of the modem at the access module such that the channelized circuit functionality of the modem need not be transmitted across the transport network to the called party and statistical multiplexers and other compression techniques can be utilized at the access module to decrease network costs. Only the useful portion of the data is transmitted in the transport network. The transmission format can also be adapted at the access module (e.g. rate adaptation, protocol translation, etc.) to better match the terminals, transport, or service capability available.

Earlier referenced applicants' co-pending application Ser. No. 08/516,269 filed on Aug. 17, 1995 (now U.S. Pat. No. 5,610,910 Mar. 11, 1997) describes several ways of achieving the objects listed above.

Figure 7:
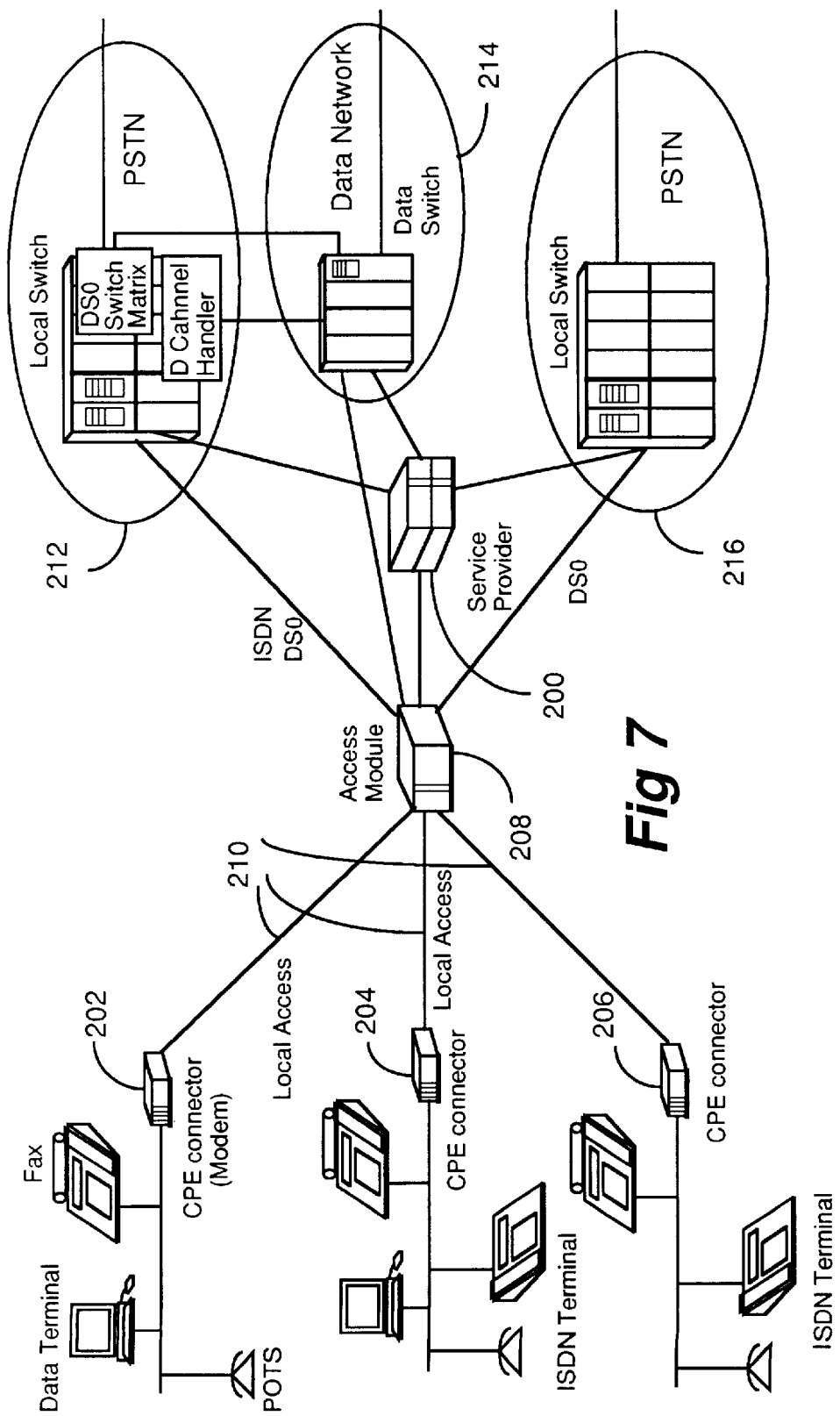
FIG. 7 shows access to various service providers according to the invention.

Among them, FIG. 7 illustrates diagrammatically one implementation embodied in the actual environment, in which a plurality of different types of CPEs can access a plurality of different types of services provided by service providers which may utilize different types of transport networks, e.g. PSTN 212 and data switched networks 214. The data switched networks may include, among other networks, a packet switched network, an ATM network using protocols such as TCP/IP, X.25, ATM, etc. Two types of local switches, one with a D channel handler for ISDN access and one without it, are shown in the PSTNs. There is shown a service provider 200 who provides various services through the networks. Collectively, it is called a service provider but in reality there are many service providers including PSTN providers, data switched network providers, data network access service providers, database service providers, wireless access providers, CATV service providers, etc. CPEs are able to seamlessly access various services provided by the service provider through local access and cooperating modules called CPE connector and an access module. In the figure, three groups of different CPEs, e.g. a POTS, data terminal, fax, ISDN terminal etc., are connected to three different CPE connectors 202, 204, 206 with differing capabilities. Each CPE connector operates with the access module 208 through its local access 210. The access module contains a plurality of line interfaces, each interface looking after each local access. The access module 208 connects service providers who may have their own networks or may utilize any of a plurality of transport networks 212, 214 and 216 for services requested by CPEs. In the figure, three local accesses are shown as an example only. As CPE connectors are provided with different capabilities depending upon the customer's needs, the access module must be able to adapt to such capabilities. This is accomplished by providing the access module with a matching line interface for each local access, or by providing universal line interfaces with a capability to emulate different local access and CPE connector. In the figure, CPE connector 202 is shown as a simple modem with no special intelligence, whereas CPE connectors 204 and 206 contain a variety of capabilities which match those of the access module.

Figure 8:
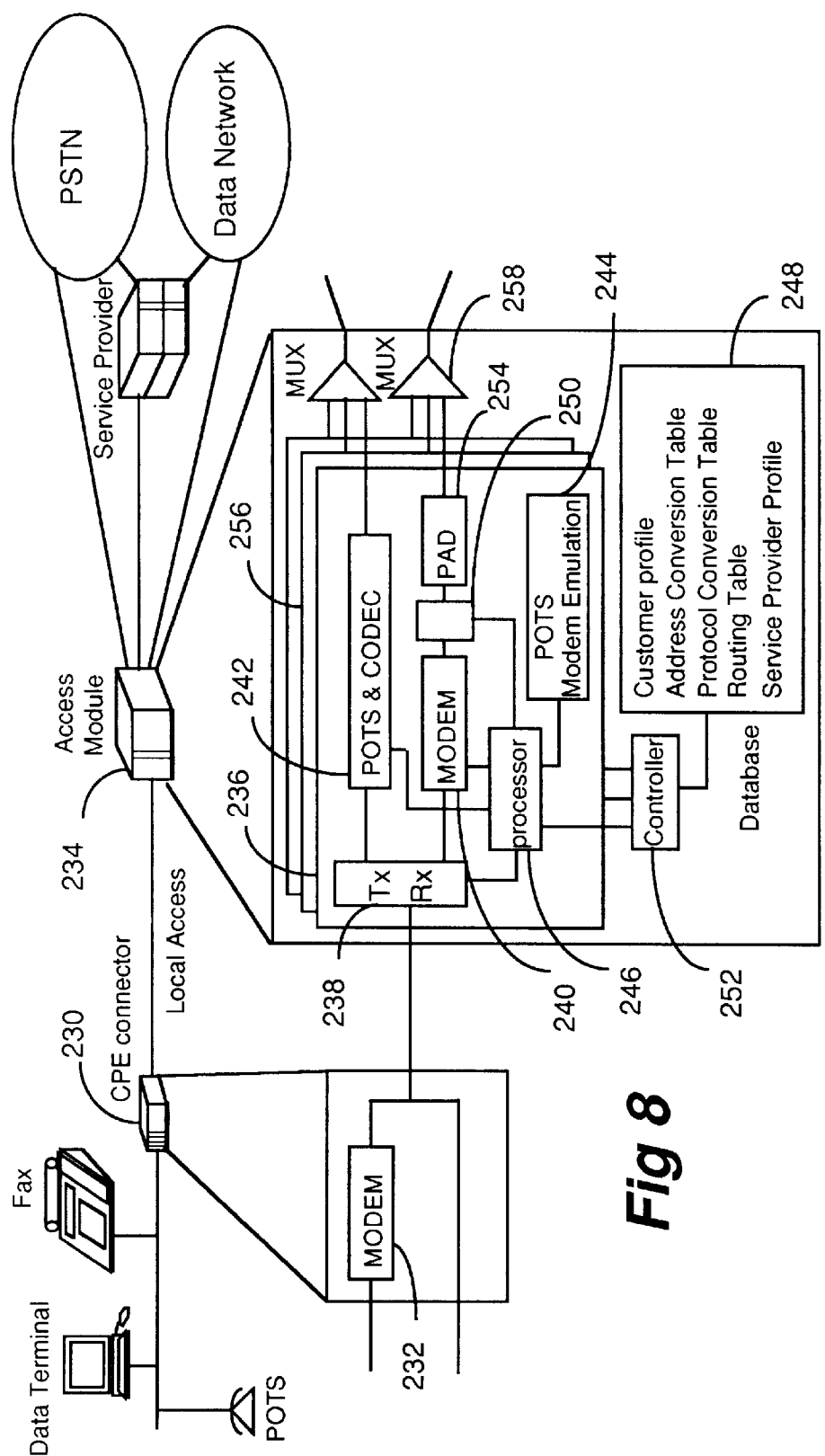
FIG. 8 shows in detail a CPE connector and an access module in a local access network according to one embodiment.

FIG. 8 shows one local access network according to one embodiment. In the figure, CPE connector 230 includes a simple modem 232 for handling computer or fax signals. Voice signals from a telephone set and modem signals are sent over the local access. It should be noted that in most cases computers and facsimiles have their own modem. In those cases, the CPE connector would simply be a junction point of the CPE modem and the telephone set. Services requested by the CPE and provided by service providers are transported through the network in various forms. Connection requests and grants are embodied in many different protocols. In all these cases, information concerning services and protocols are transmitted as electrical, and/or optical signals. The local access consists generally of a pair of twisted copper wires, although many other local access facilities are available for different bandwidths, such as wireless, fiber optics, coax cable, etc. An access module 234 at the end of the local access has a line interface 236 for this local access. It contains a transceiver 238 with identifying capabilities and a modem functionality 240. It also contains POTS/codec service 242. The identifying circuit detects and identifies a service request as a POTS service or data service request. The modem and POTS functionalities can be emulated by software stored in a memory 244 and downloaded by a processor 246 as required. They can also be built into the access module as a dedicated resource directly on, or associated with, the line interface. They can also be provided as a shared resource serving several line interfaces.

A processor 246 performs a selection and enablement of either POTS service or data services in response to the identifying circuit. The access module also has a local database 248 or has access to a remote database, both of which store information concerning the user profile, address table and service provider profile, etc. A decoder 250 decodes the modem signal and a controller 252 analyzes the contents of a data connection request to identify the service requested. Upon identification of the type of service requested, the controller performs address conversion, protocol conversion, rerouting etc., and exchanges packetized data formed at PAD 254 (packet assembly/disassembly) with the data network in accordance with information stored in the database. The information from the database may also call for multiplexing functions of signals from other line interfaces 256 by MUX 258.

The database contains a user service profile (USP), such information concerning the user subscribed service categories, the modalities of handling different types of traffic, and address conversion for easy addressing The database may also contain protocol conversion, rerouting, and other information which may be required by transport networks for better management. The user service profile (USP) can be built as a subsystem in each access module, a separate computing module serving several access modules, or it can be integrated into existing capabilities such as intelligent network (IN) data storage and retrieval devices. Regardless of the specific implementation, the USP will facilitate remote access by the end-user, network provider and service provider to view, create, modify or erase information in a user service profile. The remote access capability will include several levels of security to provide protection of the database information, and the user or service provider may change privileges.

As mentioned earlier, the modem functionality at the access module can be emulated by software or built into a dedicated device. In either case, the modem functionality provides all layer 1 and layer 2 functionalities supported by today's modem standards. As part of layer 1, these functionalities include physical connection activation and deactivation, data circuit identification, sequencing, either synchronous or asynchronous transmission of physical service data units, and fault condition notification. Layer 2 implementation may include data link connection, error notification, flow control and data unit transfer. The basic difference from the current private line modem implementation is that the access line can be used alternatively between, for example, voice and data.

The modem functionality is also able to emulate all the capabilities of the corresponding customer modems in accordance with the requested service. For example, implementing the V.34 modem capability, the access module will be able to interface with 28.8 Kb/s customer modems and also negotiate the lower rate connections function and actual capability of the user's modem.

The modem in the access module is also able to dynamically adjust the speed of communications with the customer's modem, function of the speed limitations imposed by the far-end access module, or by the far-end modem. This capability is realized by the presence of a communications capability, in-band or out-of-band, between the access module and the distant equipment to which the user is connected. Three possible configurations will be supported.

FIG. 9 depicts one configuration which involves communications between two users 300 and 302 connected to the data network 304 through access modules 306 and 308. End user modems 310 and 312 are connected to access modules. The two access modules 306 and 308 negotiate the characteristics of the communications link based on the end-user modem capabilities and the available network resources.

FIG. 10 shows another configuration which involves a user 350 connected to the data network 352 via a modem 354 and an access module 356. A distant user 358 is connected to the PSTN 360 via dialup modem 362. The access module 356 has the options of handling the call as a voice call through PSTN, or as a data call by routing it through the data network and invoking a network dial-out protocol (e.g. V.25 bis) at the far-end to allow completing the call through PSTN.

A third possible configuration is shown in FIG. 11 and involves a user 400 connected to the data network 402 via an access module 404. A service provider's server 406 is connected to the data network 402. The access module will negotiate the characteristics of the communications link based on the end-user modem capabilities and the available network resources.

When a customer's service request is first detected, it is determined whether the request is for data services or a POTS service, and then the type of data service is determined by consulting the database. It should be noted that this service request comes to the access module from either direction, that is to say, in one instance a near end user requests a service from service providers and in another, in response to a service request from a far end user, a service provider requests an access module to make a connection to any CPE at the near end user.

According to one embodiment, detection of a service request is performed by a procedure herein called a "service default" procedure. In this embodiment, the access module is in the default, e.g. "service default", state. In the service default state, the network is normally receiving and expecting packet data. Therefore data can be initiated from or received by the CPE at any time. As described above, this is a marked difference from the existing procedure involving a PSTN where the default is POTS services. The access module can alter the state of the access at any instant that a service request is received.

When the access module is in alternate (non-default) state, the line interface provides the physical interface to the user's copper loop. It includes the basic "BORSCHT (Battery, Overvoltage protection, Ringing, Supervision, Coding, Hybrid, Testing)" functionalities specified for POTS services, i.e. providing battery, current detection, electrical protection, signalling recognition (pulse or DTMF), analog/digital conversion, and loopbacks for testing.

According to this embodiment, the user subscribes to two types of services, a data service supported by a 28.8 Kb/s modem and a voice (POTS) service. The line interface is remotely programmable by the network service provider with two distinct personalities, one includes a data service 28.8 Kb/s modem emulation and the other a POTS line interface. The "service default" identification method defines a default state for the interface "data service".

In the service default state, when the customer modem (CPE connector) is activated, the access module line interface sends a carrier frequency and initiates the modem-to-modem handshaking protocol. Subsequently, in the service default state, the user can originate data transmission and can receive data from other data service users on the network. The type of requested service is identified by analyzing the content of a service request by consulting the database.

A customer's request for POTS service, for example by using a DTMF symbol "*" or "#", is interpreted as a request for dial tone and the data connection is dropped. The POTS personality is then downloaded to the line interface and the processor provides the physical interface to the user's copper loop. The request for dial tone is passed to the local circuit switch, e.g. via TR-303 protocol.

At the termination of the POTS call, the access module reverses to the default state by downloading the modem personality to the line interface.

A change of mode can be caused not only as a result of an initiated request by the user but as a result of an automated non-intrusive observation of the channel. By non-intrusive observation, the access module monitors customer communications activity during an already-established call. This monitoring is used by the access module to detect another call attempt by the user and to determine the type of service requested. An example of an implementation of this functionality is an extension of the capability described earlier. With a "POTS mode" personality, the line interface identifies and interprets a carrier from the user modem as a request for data service. Several possible actions are available to the access module. In this example, a data service request initiated by the user during a POTS call will disconnect the phone and present a carrier to the user's modem.

According to yet another embodiment, the access module operates in a dual-mode operation in which the voice service and data service are supported simultaneously on the local access. For example, provided that the user's modem has appropriate capabilities, the access module can simultaneously support voice traffic with a bandwidth of 32 Kb/s and data traffic at 9.6 Kb/s.

The service identification capabilities of the access module is also used to segregate the outgoing traffic by type of service and to direct it to the appropriate network resources to carry it to the intended destination.

The access module can direct the voice traffic to a channelized bus, multiplex it on a transport facility and then interface with a local switch at the edge of PSTN. The switch interface may implement any of the current standard interface specifications, for example the interface described in Bellcore's TR-303.

Figure 12:
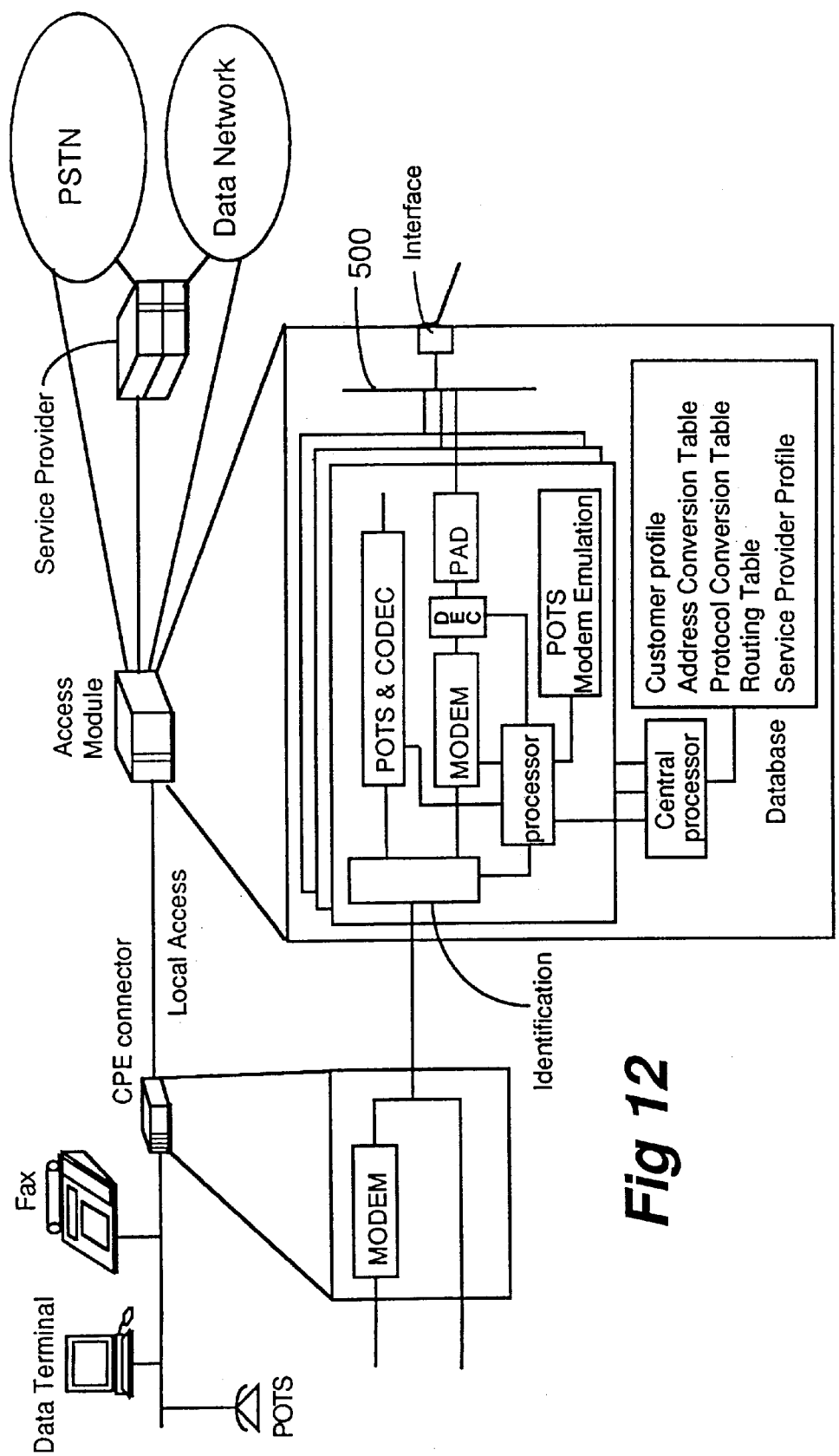
FIGS. 12–15 show in detail a CPE connector and an access module according to other embodiments of the invention.

In a different embodiment, as shown in FIG. 12, the access module can also direct the data traffic to a non-channelized bus 500 running a LAN-type protocol, to which bus outside connection can be provided through an interface device such as a bridge etc. This bus supports the interface to all user data traffic homing on the access module from near end users as well as far end users. The bus implements a simple addressing scheme for the user's data.

By using information stored in the database, protocol translation, address conversion, and mediation of services on a service by service basis is possible and is accomplished through the use of mediation in the access module based on tables under the control of both the users and services providers. The access module can then interface with a variety of data networks to deliver/receive the data services traffic. The actual network selection is based on the information contained in the user service profile. An embodiment of this functionality includes one or more circuits providing gateway functions to the associated network equipment. A list of possible network interfaces include X.25 packet networks, frame relay, SMDS, ATM, TCP/IP, etc.

Figure 13:
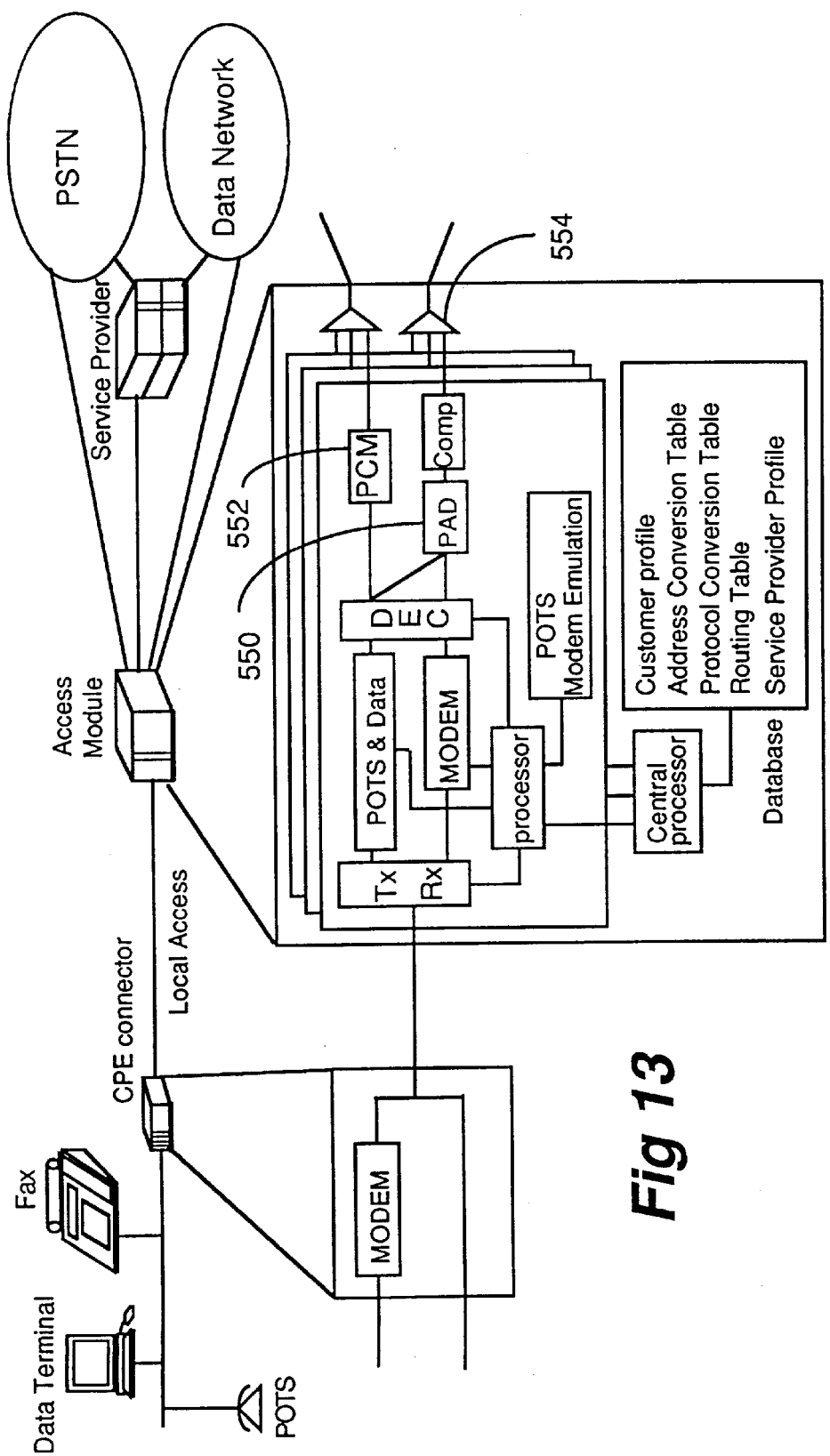

FIG. 13 shows yet another embodiment in which the access module can dynamically select a different network from the one prescribed in the user profile, to carry the packetized data traffic. This alternate selection will not adversely impact the quality of service (QOS). An example of the use of this capability is to route data traffic on PSTN during low traffic load periods. Similarly, the access module can packetize voice at PAD 550 and route voice traffic on a data network. The voice service QOS is maintained by continuous monitoring of the transmission delay.

Several non-content altering functions can be implemented in another embodiment, also shown in FIG. 13, at the access module to further increase the efficiency of the packetized data transport through the network. Examples of these functionalities include data compression at 552 and statistical multiplexing at 554.

Recognizing the request for existing services such as 411, 611 and 911 as an automatic data connection will enhance the services being provided and lead to a simpler, less expensive implementation of these services.

Thus far, the invention has been described in circumstances in which the CPE connector is a simple modem without intelligence. In further embodiments of the invention, local access capability can be further extended if the CPE connector is a modem provided with intelligence. Then the access module and the CPE connector can negotiate a variety of parameters which will be described below.

Referring to FIG. 7, the CPE connector 204 contains greater capabilities which match with those of the access module. In this example, CPE connector 204 connects its local access and a plurality of CPEs, e.g. a POTS, a data terminal, fax, and an ISDN terminal.

Figure 14:
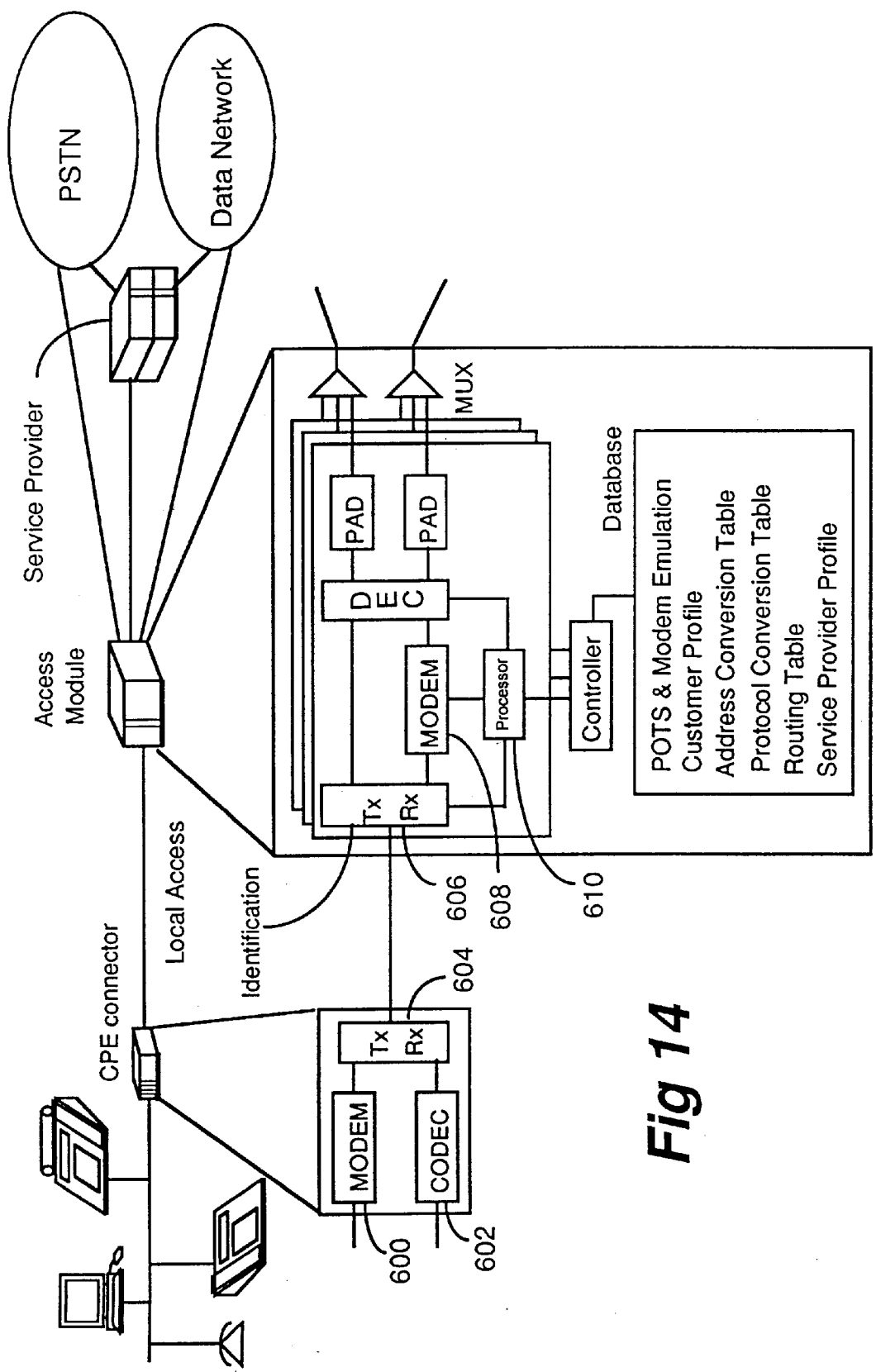

FIG. 14 shows in more detail the CPE connector and the access module. In the figure, the CPE connector includes a modem 600 for handling computer signals and a codec 602 to handle the telephone set signal. The codec converts analog signals to/from PCM signals (e.g. ADPCM signal). PCM signals and modem signals are sent by a transceiver 604 over the local access in a line code. There are many line codes such as 2B1Q etc. available for this purpose. The bandwidth of a pair of twisted copper wires can be raised to 128 kbps or higher, depending upon the line code used, although many other local access facilities such as wireless, fiber optics coax cable etc., have different and mostly wider bandwidths. An access module contains a companion transceiver 606 and a modem 608. Of course, like earlier embodiments, these modem functionalities can be emulated by software and can be built into the access module as a dedicated resource directly on, or associated with, the line interface or as a shared resource serving several line interfaces. A modem built as a shared resource negotiates the parameters of the communication link on a connection request-by-connection request basis.

Transceiver 606 monitors the traffic coming in from both directions. The access module has a database or access to a database storing the user profile, the available communications resources and the status of these resources. Upon identification of the type of service requested by the user, a processor 610 of the access module determines an intelligent method of handling the customer traffic by consulting the information.

The local access is the facility connecting the CPE and the access module. It is a limited resource shared among all communications services used by the customer. Its capabilities are limited by the transmission characteristics of the copper pair, wireless connection or CATV based facility etc., and by the specific transmission equipment used at the two ends. In this embodiment, the CPE connector has capabilities which match the access module transmission capabilities and has also sufficient intelligence to execute the instructions received from the access module. With these capabilities, the access module provides significant flexibility in the actual services mapping onto the local access.

With a matching CPE connector which contains matching modem capabilities, the access module can negotiate and agree with the CPE connector on an appropriate transmission scheme which provides efficient use of the bandwidth of a local access in the following manner. Bandwidth flexibility can be controlled by the access module to dynamically negotiate and allocate the desired amount of bandwidth to the local access on a service-by-service, call-by-call basis. For example, the total bandwidth available can be allocated in multiples of a predetermined fixed unit channel capacity, e.g. n×64 Kb/s for a DS-1 rate, or can be made available in a non-channelized fashion allowing data traffic bursts up to the maximum speed of the local access facility.

Alternate use of the local access by different services can be accomplished by negotiation, on a service-by-service, call-by-call basis, between the access module and the CPE connector of the amount of bandwidth to be allocated to the service prior to originating or terminating the call. For example, on a digital loop using 2B1Q coding technology, 64 Kb/s out of the available 144 Kb/s may be allocated to a voice call. Alternatively, to complete a data call, 144 Kb/s may be used to support the maximum throughput of the data connection.

Simultaneous use of the local access for originating/delivering multiple communications services can also be achieved in the invention. This new functionality is enabled by the access module to dynamically negotiate, partition and allocate the available access bandwidth among the various services. The end user can also enable services and assign priorities in real time to the access module, without appreciable loss of grade of service for individual services. This functionality allows such things as enabling multiple services within a generic service, i.e. two simultaneous faxes or a voice and data call with appropriate handling screen prompts provided to the terminal (1), etc., for the specific services being provided.

Figure 15:
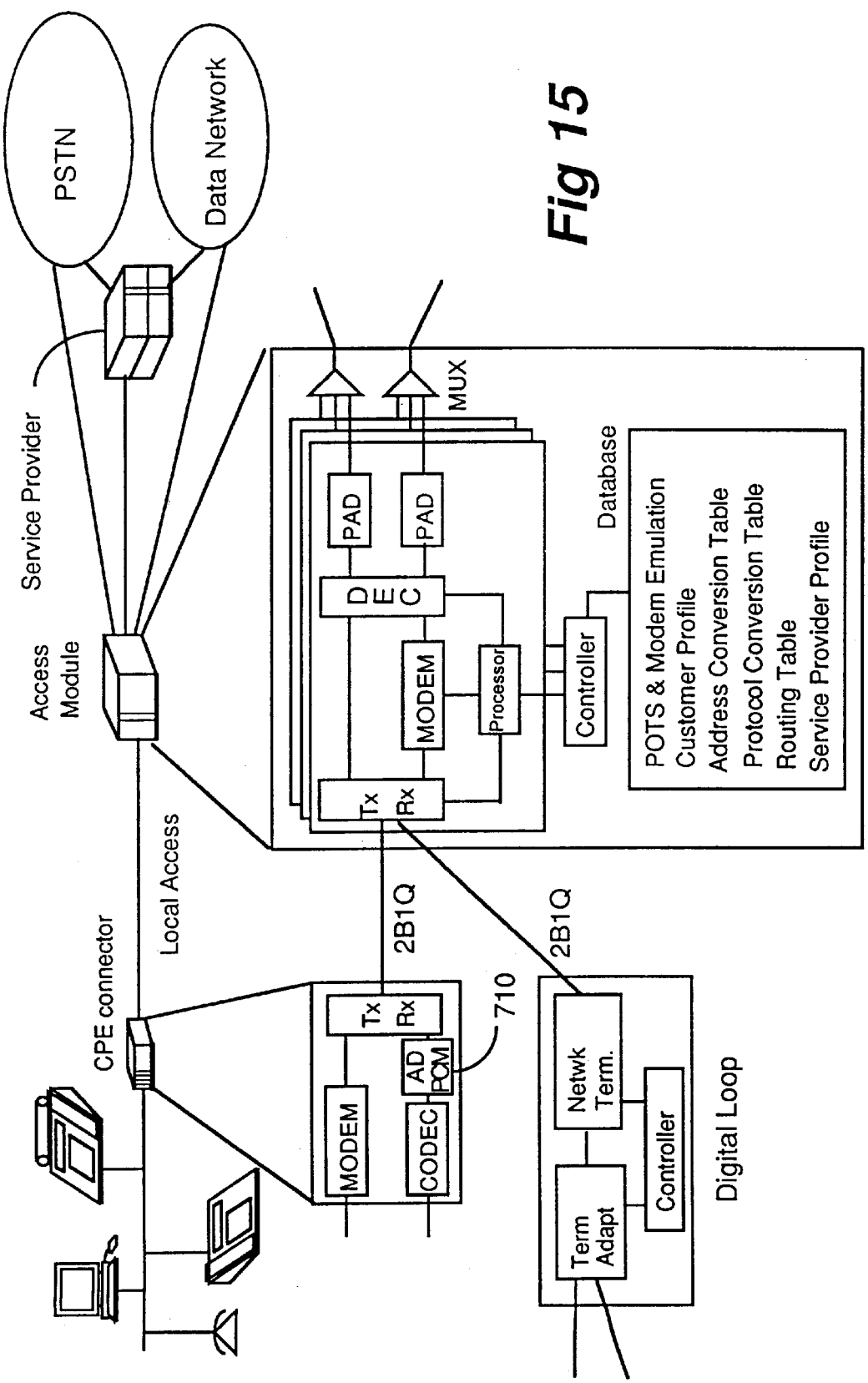

FIG. 15 shows one embodiment which illustrates the utilization of this capability. A digital loop using, for example, 2B1Q coding technology can support a voice and a data call simultaneously. The initial negotiation between the access module and the CPE connector can allocate 64 Kb/s to the voice call and the remaining 80 Kb/s to the data traffic. A new incoming voice call can be handled simultaneously with the ongoing calls. In this embodiment, the access module and the CPE connector invoke a voice compression algorithm 710, e.g. 32 Kb/s ADPCM, and deliver both voice connections within the initial 64 Kb/s allocated bandwidth. This procedure will not impact the transfer speed for the data connection. Another embodiment is for the access module and the CPE connector to allocate 64 Kb/s to the second voice call and reduce the bandwidth allocated to the data traffic to 16 Kb/s. These possible actions can be enacted automatically by the access module based on a pre-arranged user service profile, or they can be enacted by specific user commands upon receiving a notification of the incoming call. Customarily this CPE connector can be realized by the use of devices commonly known as NT1 and terminal adapter as shown in the figure.

A user can indicate a change in the service request, and/or can select a different action from the access module by using a sequence of low-level signaling schemes, e.g. hook flash or DTMF, or a message based control communications scheme. The access module will support a message-based communications channel between the CPE and the access module for passing status information and control messages. An example of the use of the message-based communication channel is when a user is changing the service profile stored at the access module.

Abbreviated dialing can be used to inform the access module of the user's intent to place a POTS call or establish a data connection. In a similar example with the one presented above, the user subscribes to two types of services, a data service supported by a 28.8 Kb/s modem and a voice (POTS) service.

In another embodiment, communication is requested by the user via a request for dial tone. A special frequency dial tone is originated by the access module. In this example, a request for a data connection is preceded by a "1" DTMF signal originated by the user's modem. The access module ensures that the line interface has a "data mode" personality software. A request for a voice (POTS) connection is preceded by a "0" DTMF signal originated by the user's telephone. The access module ensures that the line interface has a "POTS mode" personality software.

The same method can be used to initiate a change from an established data call to a voice call, or from an established voice call to a data call. As in the earlier embodiment, recognizing abbreviated dialing at the access module rather than the local switch can also provide a simpler, less expensive implementation of existing services, such as 411, 611 and 911. Recognizing the request for these services as an automatic data connection can enhance the services being provided.

The access module also has the capability of providing conversion between packetized voice and PCM to allow for alternate routing. This allows the use of a multiplicity of access and transport networks in the establishment, translation, and completion of a service transaction by the access module under the control of the end user. Providing protocol translation, address conversion, and mediation of services on a service by service basis is also possible.

Where protocol conversions are required to allow connection of dissimilar services, terminals, or network elements, this is performed in the access module after consulting the appropriate service database. An example of the need for this functionality is the delivery of messages originated on a workstation to a telephone terminal with display capabilities using the ADSI protocol. The access module provides address translation and address correlation functions. This is accomplished by specific routing tables that are contained in or accessible by the access module. These routing tables are updateable from various sources in the overall network.

An example of the use of this functionality is the translation of an Internet address to a packet data address for delivery to a packet network user. Another example is the correlation of an Internet user address with his PSTN address for delivery of voice traffic originated on a computer to a telephone set.

The intelligent access module enables the specific service to be routed to many different networks or service providers according to the address, service identified, network resource availability, and user preference profile. This is accomplished by specific routing tables that are contained in or accessible by the access module. These routing tables are updateable from various sources in the overall network. The invention provides for information format changes necessary to accommodate communications over various facilities and the use of common bus and LAN protocols between the access module and the various services providers or the data networks or the CPE connector.

This invention provides for logical assignments in real time at the access module or services provider for alternate routing among available transport networks, e.g. voice can be routed over data networks and vice versa. This allows dynamic traffic load balancing, alternate routing, resource sharing and service management of the information transfer throughout the network, thereby minimizing protocol and transport translations between the end points.

This invention further provides extension of the LAN functionality out to the CPE by extending the layer 2 and above protocols into the CPE connector (4) from the access module. The access module maintains the "point-of-presence" or "map" among CPE devices, service providers, and network resources. This is accomplished by maintaining files of resources, profiles, preferences, addresses, and protocol conversions.

The intelligent dialogue between the CPE connector and the access module provides the ability to simulate, for the end user and the service provider, a simple to use, customizable LAN-type environment. The access module will support a specific customer service profile by continuously updating the CPE on the availability of a particular server anywhere on the network. At the same time, the access module will indicate the presence of a user device to the service provider community.

According to a further embodiment, the access module has the capability to store user's incoming and outgoing information, and forward the information in its original form, or modified according to the user's profile and under user's control. The actual storage device can be built into the access module, or can exist as an external resource to which the access module has access.

The following examples illustrate the use and benefits of this capability.

One example shows the use of the access module storage capability in optimizing the information transfer rate through the network and enhancing the use of network resources. In the current implementation, the information transfer between two terminals, or between a server and a terminal, is performed at the lowest of the maximum speeds supported by the two devices. This results in inefficient use of the faster device, and inefficient use of the network resources, i.e. higher overhead and longer holding times. The storage capability of this invention improves the information transfer by segregating a device-dependent transfer rate in the access and the device-independent network transfer rate. The information originated by the slower device is stored at the access module and is transferred through the network at network optimum speed. An access module at the far-end delivers the information at the optimum speed of the receiving device.

Another example of the use of the storage capability of the access module is the more efficient use of network and CPE in handling fax messages. In the current implementation, the originating fax machine attempts to establish a real-time link with the terminating fax machine, prior to sending the information. When the terminating fax machine is busy, the originating fax machine repeats its attempt to connect at regular intervals. Storing the information at the access module improves the process by ensuring the delivery of the fax message in a single attempt. The fax information is stored at the access module and it is delivered when the destination device is available. In addition, the benefits illustrated in the previous example also apply. A fast fax machine does not have to wait for the handling response of a slower machine.

A third example illustrates the benefits of the access module storage capability in time-shifting the delivery of a message under user control. In the current implementation, if the destination device is not available to receive the message, the originator will have to repeat its attempt to connect to the destination device, or, if the connection is established, the originator will receive no indication that the message was not received. This invention allows the message to be stored at the access module for later delivery and also the access module can provide the originator with some indication on the progress of the delivery. The access module will inform the destination user of the waiting message by sending a notification to a different device according to the user's profile. A notification of an incoming message can be sent to the user display phone using the ADSI protocol. The destination user has the ability to select from a list of available options the desired action, e.g. receive the message, delete the message, send automatic acknowledgement to the originator, etc.

Figure 16:
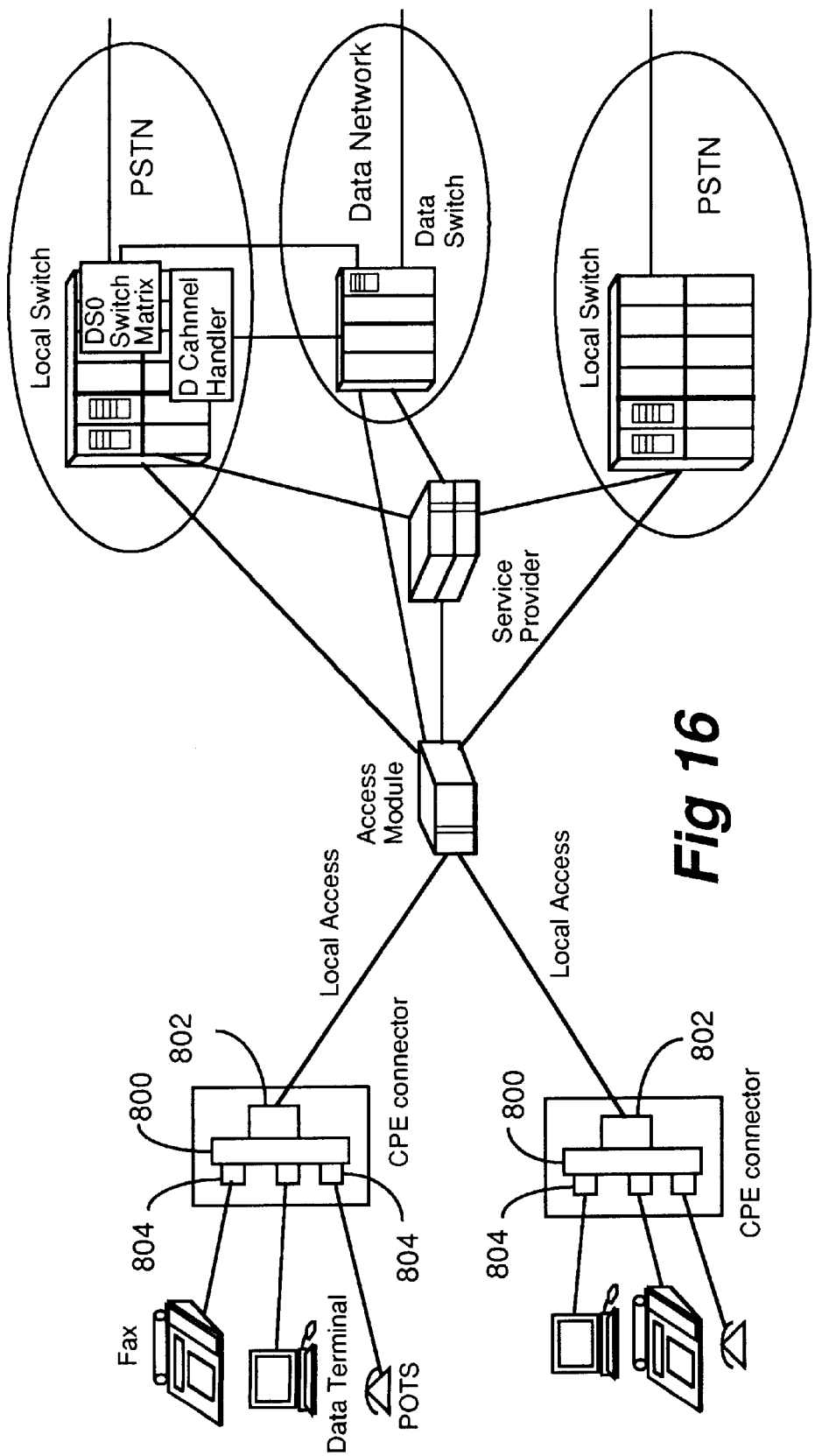
FIGS. 16 and 17 show schematically another embodiment in which CPE connectors are designed by using a common bus architecture.
Figure 17:
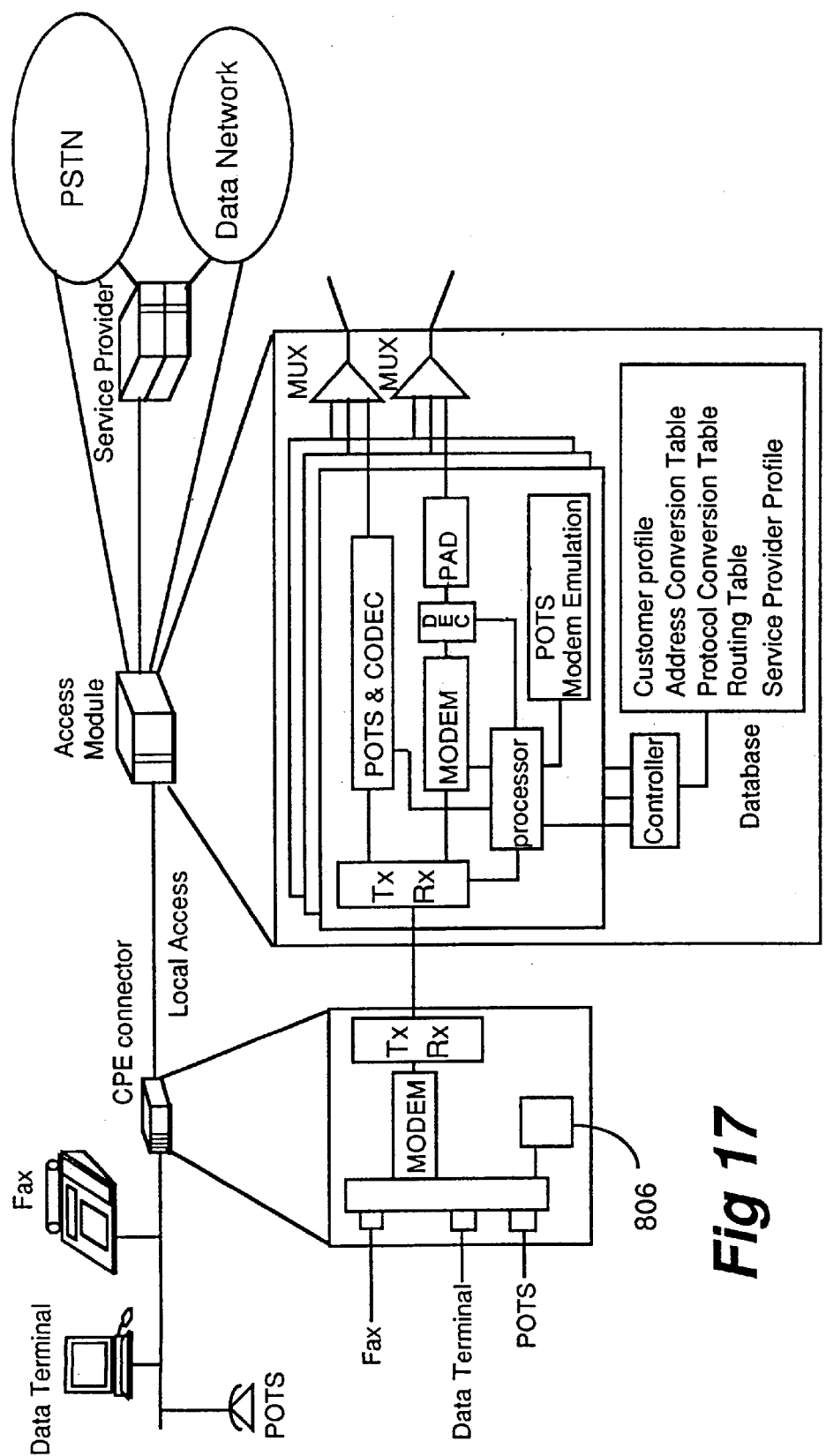

Referring to FIGS. 16 and 17, a further embodiment of the invention is illustrated. In FIG. 16, two CPE connectors are shown to be connected to an access module. Like earlier embodiments, the CPE connector handles traffic from a variety of CPEs such as Fax, data terminal, POTS etc. In this embodiment, the CPE connector is provided with a common bus 800 to which appropriate modems 802 and interface devices 804 are connected, forming a backbone LAN with a LAN (bus) controller. The LAN (bus) controller is shown as 806 in FIG. 17. Any group of CPEs may form a subnet which in turn is connected to the backbone LAN. As in the embodiments described earlier, the physical interface to CPEs and subnets can take a variety of forms and media e.g., coax, copper, fiber, wireless, coaxial connector for 10BaseT Lan, RS232 connection for PCs, RJ11 for telephone etc. The interface can also be serial or parallel and CPEs can be connected in various configurations such as star and ring, etc. The bus controller, together with a storage device and resources (not shown) on this common bus, performs translation and other signal processing including such processing as authentication, encryption, firewalling, screening the services, network messages time-of-day services, remote control of CPEs, telemetry etc. and any service can be translated from various CPEs to the local access and vice versa. For example, the CPE connector can use the BRA (basic rate access) format line signal to negotiate with an access module to route appropriate POTS, ISDN BRA, or to route dial up data modem traffic to the PSTN. Encapsulation techniques such as SLIP/PPP allow TCP/IP traffic to be passed between CPE and an access module. The access module thus allows TCP/IP traffic to be sent directly to any access or service provider on the data network desired by the end user.

Figure 18:
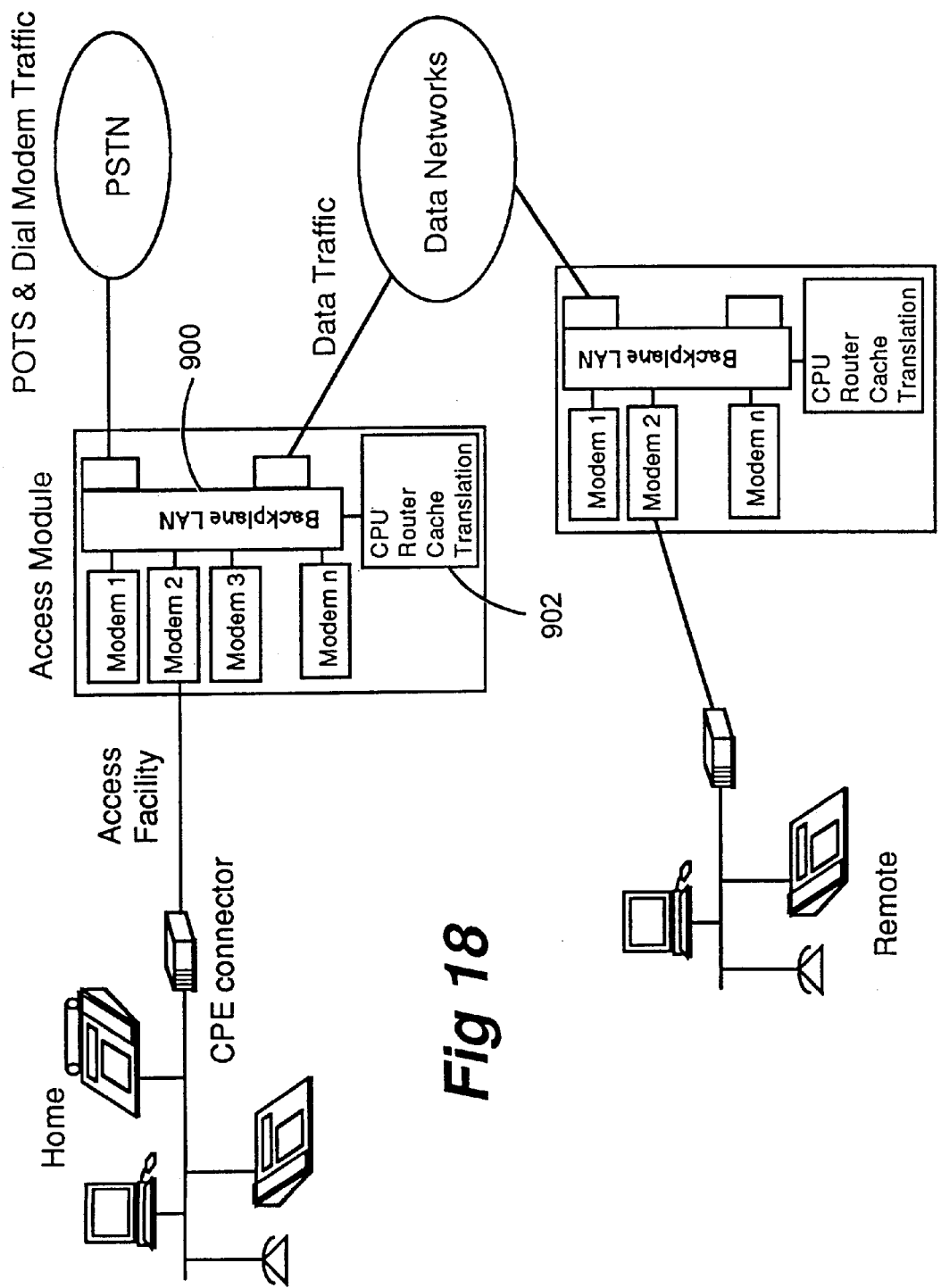
FIG. 18 shows schematically yet a further embodiment in which the common bus is employed in the access module.

In a further embodiment, the common bus architecture can be used in the access module, as shown in FIG. 18, in which a backplane LAN 900 is formed by a common bus and the bus controller 902 performs translation and other signal processing, and any service can be translated either from circuit switch to packet or vice versa. By using this common bus architecture coupled with intelligence and storage, further capabilities can be added easily to the access module.

As also seen in FIG. 18, these capabilities include a network redirecting services to a different destination function of the physical location of the user, for example, logging into an access module different from the "home" access module, authentication and activating a "remote" profile. The "remote" access module will communicate with the "home" access module activating the "remote" user profile. Subsequently, the "home" access module will redirect the specified subset of the user's services to the "remote" location. The default "home" profile will be reactivated at the termination of the user's session.

Figure 19:
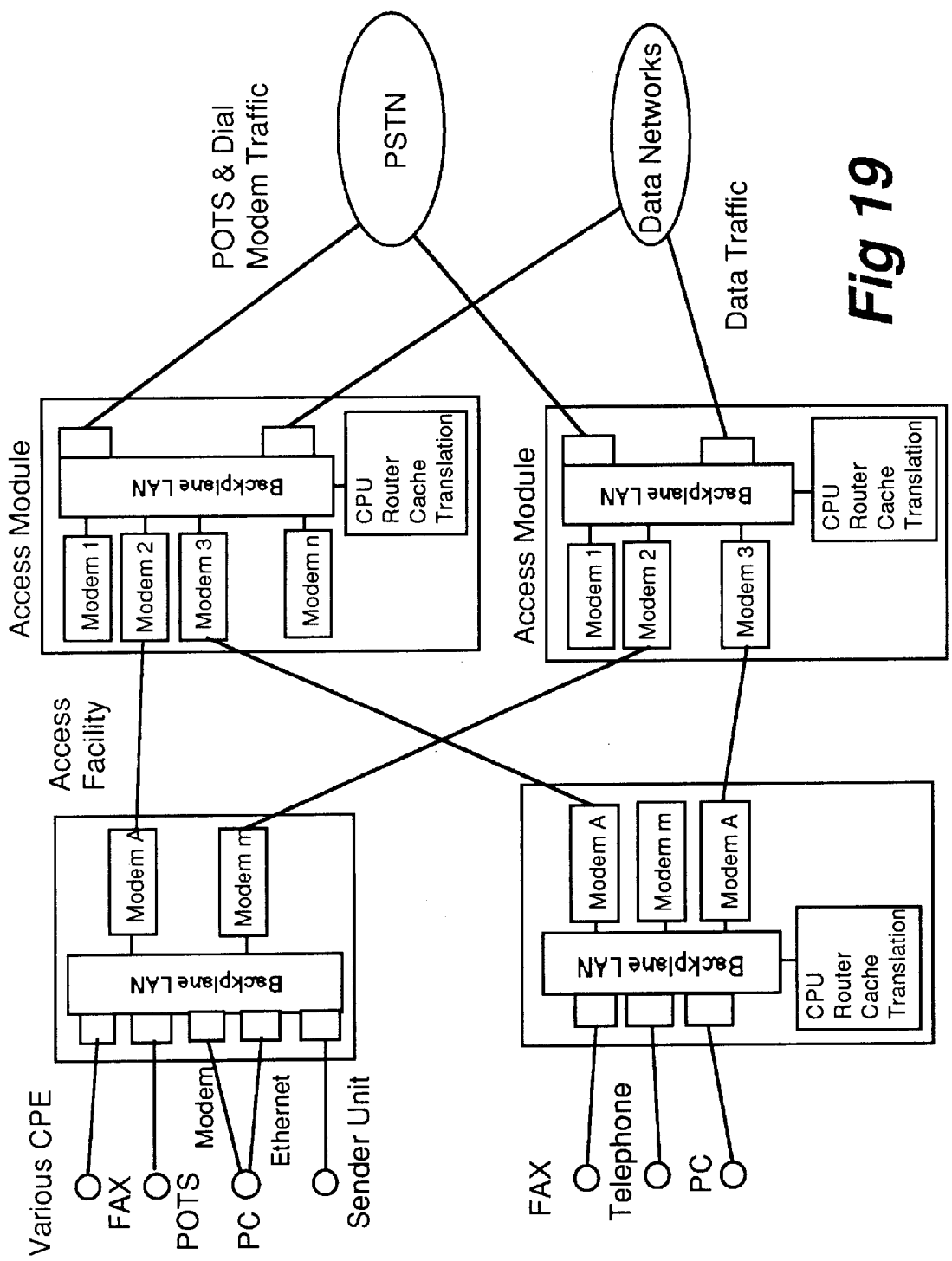
FIG. 19 shows schematically a further embodiment which uses the common bus architecture in both CPE connectors and access modules.
Figure 20:
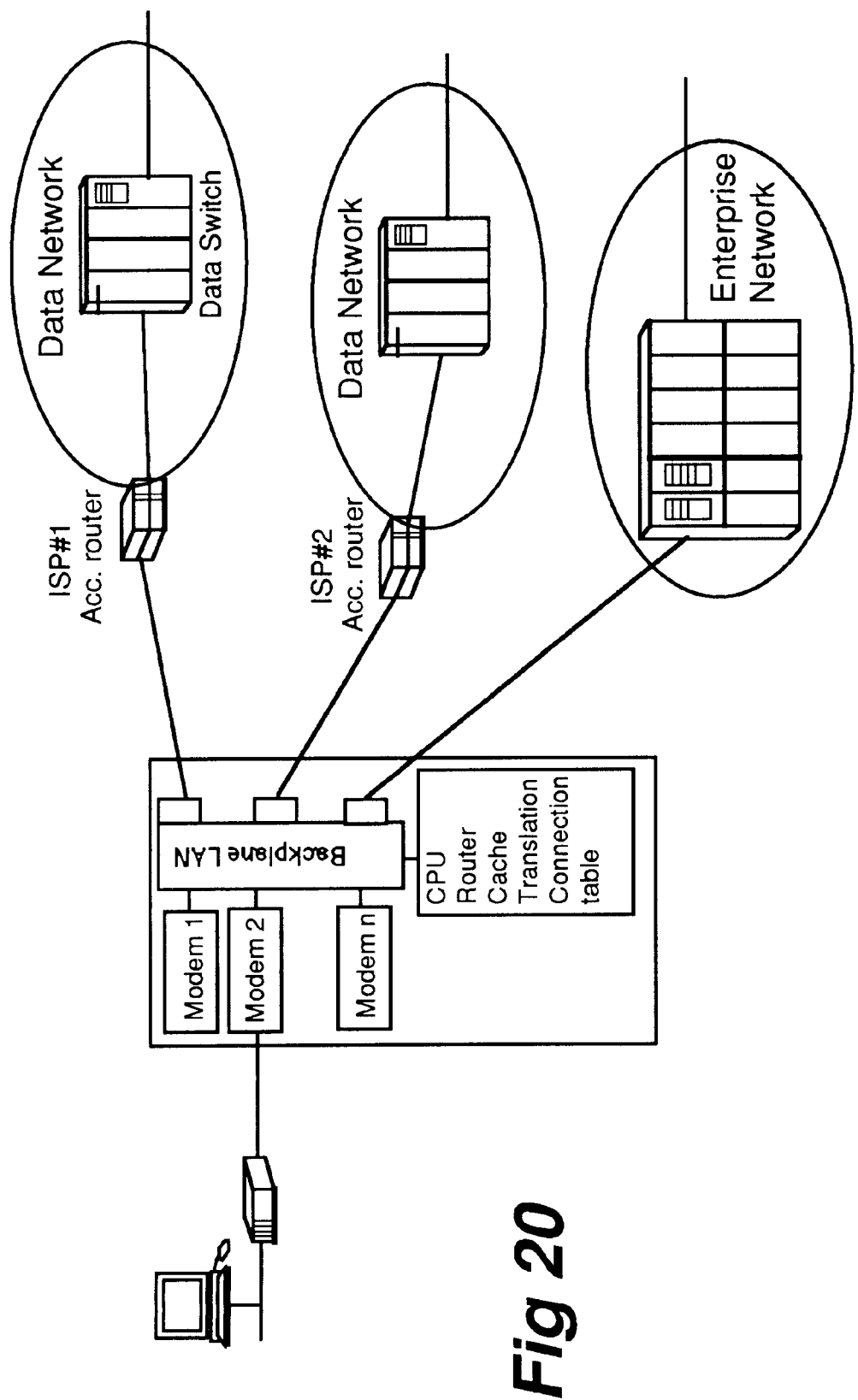
FIG. 20 is a schematic illustration of direct connections of a CPE to data network service providers.

In yet another embodiment, shown in FIG. 19, both CPE connectors and access modules are designed by the common bus architecture forming a distributed controller network with a very flexible resource management capability. One of the useful resource management services is the ability to select a specific path for traffic between a CPE and a service provider among many available paths. For example, a connection request from a user to a service provider goes through a CPE connector to an access module on one path having a certain bandwidth. If downstream traffic from the service provider requires a wide bandwidth, it is possible that the traffic may be passed to the CPE connector by way of another path through a second access module. If a path has a partitionable bandwidth, upstream and downstream traffic can share the same path, with a properly adjusted bandwidth for each direction. Multiple access modules and multiple local accesses are also very suitable vehicles to build a more flexible and survivable access network. An alternative path can be provisioned readily by the user or the network provider, etc. for any reasons, e.g., emergency, route diversification, etc.

It is also envisaged that in the case of data services, a user is able to dynamically connect to an enterprise network of his choice. For example, for Internet in particular, a user can dynamically select access ISP #1 (Internet Service Provider #1) or ISP #2. This is accomplished with the cooperation of a CPE connector and an access module. The access module has a user profile in its storage, the user profile containing a connection table indicating the connectivity of the user access to specific networks or ISPs. The user and his CPE connector send messages to the access module to change the selection of possible connections in the connection table. The user can then dynamically instruct his data traffic to be directed to any network or ISP.

What is claimed is:

1. An access network for interfacing CPEs and communications networks which encompass PSTN, data networks, wireless networks, satellite networks, CATV and ATM networks by way of a local access to form a universal services network comprising:
   a CPE connector including a CPE connector storage device and CPE connector processor; the CPE connector storage device holding information concerning any of CPE functionalities, network resources, user preferences and service provider requirements;
   the CPE connector deciding on an appropriate choice concerning any of CPE functionalities, network resources, user preferences and service provider requirements, based upon information content extracted from user traffic and the information stored in the CPE connector storage device;
   the CPE connector further comprising a common bus which interfaces the CPEs and the local access, and a bus controller for determining and routing appropriate CPEs for connection with the local access; and
   an access module comprising a line interface for interfacing the local access and the communications networks, the access module further comprising an access controller for determining and routing appropriate network resources for connection with the local access.

2. The access network according to claim 1, further comprising:
   a plurality of CPE subnetworks being connected to the common bus and containing one or more CPEs, one or more CPEs being interfaced through the CPE subnetworks with the local access; and
   the bus controller having functionalities of time-slot interchange and/or dynamic address allocation to allow connectivity or routing of appropriate messages between CPEs and the local access.

3. The access network according to claim 2 wherein the local access has a dynamically partitionable bandwidth, and the CPE connector and the access module negotiate appropriate bandwidth for each direction of traffic.

4. The access network according to claim 2 further comprising:
   a plurality of access modules connecting the CPE connector through a plurality of local accesses, each access module comprising a line interface for interfacing each of the local accesses and the communications networks, the access module further comprising an access controller for determining appropriate local access for connection between the communications networks and the CPE connector.

5. The access network according to claim 1 wherein the local access has a dynamically partitionable bandwidth, and the CPE connector and the access module negotiate appropriate bandwidth for each direction of traffic.

6. The access network according to claim 1 further comprising:
   a plurality of access modules connecting the CPE connector through a plurality of local accesses, each access module comprising a line interface for interfacing each of the local accesses and the communications networks, and the access module further comprising an access controller for determining appropriate local access for connection between the communications networks and the CPE connector.

7. The access network according to claim 1, further comprising;
   a plurality of access modules connected to the communications networks, each access module comprising an access module storage device and an access module processor to exchange, among the access modules through the communications networks, information concerning appropriate CPE functionalities, network resources, user preferences and service provider stored in each access module storage device.

8. An access network for interfacing CPEs and communications networks which encompass PSTN, data networks, wireless networks, satellite networks, CATV and ATM networks by way of a local access to form a universal services network comprising:
   CPEs having CPE modem functionalities for interfacing the CPEs and the local access;
   an access module for interfacing the local access and the communications networks, the access module comprising:
   a common bus connecting line interfaces and the communications networks;
   the line interfaces including access modem functionalities to communicate with the CPE modem functionalities through the local access;
   an access module storage device holding information concerning any of CPE functionalities, network resources, user preferences and service provider requirements;
   an access module processor for extracting the information content from user traffic for services and for deciding on an appropriate choice of any of CPE functionalities, network resources, user preferences and service provider requirements based upon the information content and information stored in the access module storage device; and
   an access module bus controller for interfacing appropriate line interfaces and network resources in response to the extracted information content.

9. The access network according to claim 8, wherein the access module storage device contains data concerning the resource utilization of the communications network to manage and to provide communications network usage reports.

10. The access network according to claim 9, wherein a plurality of access modules are connected to the communications networks, each access module comprising an access module storage device and an access module processor to exchange, among the access modules through the communications networks, information concerning appropriate CPE functionalities, network resources, user preferences and service provider stored in each access module storage device.

11. The access network according to claim 10, wherein the access module storage device contains user profile data and a connection table for the connectivity of the user access to a specific communications network, the connection table being dynamically updatable by the access module or at the request of CPEs.

12. The access network according to claim 8 further comprising:
   a plurality of access modules connecting the CPE connector through a plurality of local accesses, each access module comprising a line interface for interfacing each of the local accesses and the communications networks, the access module further comprising an access controller for determining appropriate local access for connection between the communications networks and the CPE connector.

13. The access network according to claim 12, wherein the access module storage device contains user profile data and a connection table for the connectivity of the user access to a specific communications network, the connection table being dynamically updatable by the access module or at the request of CPEs.

14. The access network according to claim 8, wherein the access module storage device contains user profile data and a connection table for the connectivity of the user access to a specific communications network, the connection table being dynamically updatable by the access module or at the request of CPEs.

15. The access network according to claim 14, wherein a plurality of access modules are connected to the communications networks, each access module comprises an access module storage device and an access module processor to exchange, among the access modules through the communications networks, information concerning appropriate CPE functionalities, network resources, user preferences and service provider stored in each access module storage device.

16. An access network for interfacing CPEs and communications networks which encompass PSTN, data networks, wireless networks, satellite networks, CATV and ATM networks by way of a local access to form a universal services network comprising:
 a CPE connector and an access module, each of which comprises a storage device and holds information concerning any of CPE functionalities, network resources, user preferences and service provider requirements;
 each of the CPE connector and access module including a processor to decide on an appropriate choice concerning any of CPE functionalities, network resources, user preferences and service provider requirements based upon information extracted from a user traffic and information stored in each storage device by communicating with each other;
 the CPE connector further including a common bus which interfaces the CPEs and the local access, and a bus controller for routing the appropriate CPEs for connection with the local access; and
 the access module further including a common bus connecting line interfaces and the communications networks, the line interfaces including access modem functionalities to communicate with the CPE functionalities through the local access, and an access module bus controller for interfacing appropriate line interfaces and network resources in response to the extracted information content.

17. The access network according to claim 16, further comprising:
 a plurality of CPE subnetworks being connected to the CPE connector common bus and containing one or more CPEs, one or more CPEs being interfaced through the CPE subnetworks with the local access; and
 the bus controller having functionalities of time-slot interchange or dynamic address allocation to allow connectivity or routing of appropriate messages between CPEs and the local access.

18. The access network according to claim 17 wherein the local access has a dynamically partitionable bandwidth, and the CPE connector and the access module negotiate appropriate bandwidth for each direction of traffic.

19. The access network according to claim 18, wherein the access module storage device contains user profile data and a connection table for the connectivity of the user access to a specific communications network, the connection table being dynamically updatable by the access module or at the request of CPEs.

20. The access network according to claim 19, wherein a plurality of access modules are connected to the communications networks, each access module comprises an access module storage device and an access module processor to exchange, among the access modules through the communications networks, information concerning appropriate CPE functionalities, network resources, user preferences and service provider stored in each access module storage device.

21. The access network according to claim 17 further comprising:
 a plurality of access modules connecting the CPE connector through a plurality of local accesses, each access module comprising a line interface for interfacing each of the local accesses and the communications networks, the access module further comprising an access controller for determining appropriate local access for connection between the communications networks and the CPE connector.

22. The access network according to claim 21, wherein the access module storage device contains user profile data and a connection table for the connectivity of the user access to a specific communications network, the connection table being dynamically updatable by the access module or at the request of CPEs.

23. The access network according to claim 16, wherein the local access has a dynamically partitionable bandwidth, and the CPE connector and the access module negotiate appropriate bandwidth for each direction of traffic.

24. The access network according to claim 22, wherein the access module storage device contains user profile data and a connection table for the connectivity of the user access to a specific communications network, the connection table being dynamically updatable by the access module or at the request of CPEs.

25. The access network according to claim 24, wherein a plurality of access modules are connected to the communications networks, each access module comprises an access module storage device and an access module processor to exchange, among the access modules through the communications networks, information concerning appropriate CPE functionalities, network resources, user preferences and service provider stored in each access module storage device.

26. The access network according to claim 16 further comprising:
 a plurality of access modules connecting the CPE connector through a plurality of local accesses, each access module comprising a line interface for interfacing each of the local accesses and the communications networks, the access module further comprising an access controller for determining appropriate local access for connection between the communications networks and the CPE connector.

27. The access network according to claim 26, wherein the access module storage device contains user profile data and a connection table for the connectivity of the user access to a specific communications network, the connection table being dynamically updatable by the access module or at the request of CPEs.

28. The access network according to claim 16, wherein a plurality of access modules are connected to the communications networks, each access module comprises an access module storage device and an access module processor to exchange, among the access modules through the communications networks, information concerning appropriate CPE functionalities, network resources, user preferences and service provider stored in each access module storage device.

29. The access network according to claim 28, wherein the access module storage device contains user profile data and a connection table for the connectivity of the user access to a specific communications network, the connection table being dynamically updatable by the access module or at the request of CPEs.

* * * * *